US012175930B2

(12) United States Patent
Li et al.

(10) Patent No.: US 12,175,930 B2
(45) Date of Patent: Dec. 24, 2024

(54) DISPLAY PANEL

(71) Applicant: Xiamen Tianma Micro-Electronics Co., Ltd., Xiamen (CN)

(72) Inventors: Jieliang Li, Xiamen (CN); Gaojun Huang, Shanghai (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 328 days.

(21) Appl. No.: 17/873,466

(22) Filed: Jul. 26, 2022

(65) Prior Publication Data

US 2022/0358883 A1 Nov. 10, 2022

Related U.S. Application Data

(63) Continuation-in-part of application No. 17/164,019, filed on Feb. 1, 2021, now Pat. No. 11,450,275.

(30) Foreign Application Priority Data

Oct. 15, 2020 (CN) ......................... 202011104618.4

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0819* (2013.01);
(Continued)

(58) Field of Classification Search
CPC ... G09G 3/32–3291; G09G 2300/0819; G09G 2300/0842; G09G 2300/0861; G09G 2310/0286
See application file for complete search history.

(56) References Cited

U.S. PATENT DOCUMENTS 8,616,886 B2 * 12/2013 Clark ..................... A45D 29/00 434/377
9,224,357 B2 * 12/2015 Kim ......................... G09G 3/30
(Continued)

FOREIGN PATENT DOCUMENTS

CN 109285500 A 1/2019
CN 109949743 A 6/2019
(Continued)

*Primary Examiner* — Patrick F Marinelli
(74) *Attorney, Agent, or Firm* — KDW Firm PLLC

(57) ABSTRACT

Provided is a display panel. The display panel includes a pixel driving circuit which including a drive transistor, a data write module, a light emission control module, a threshold compensation module and a bias adjustment module. The control terminal of the drive transistor is connected to the first node. The first terminal of the drive transistor is connected to a third node. The second terminal of the drive transistor is connected to a second node. The light emission control module is connected in series with the drive transistor and connected in series with a light-emitting element. The threshold compensation module is connected in series between the control terminal of the drive transistor and the second terminal of the drive transistor. The first terminal of the bias adjustment module is connected to a bias signal terminal and the second terminal is connected to the second terminal of the drive transistor.

24 Claims, 23 Drawing Sheets

(52) U.S. Cl.
CPC ............... *G09G 2300/0842* (2013.01); *G09G 2300/0861* (2013.01); *G09G 2310/0286* (2013.01); *G09G 2310/08* (2013.01); *G09G 2320/0233* (2013.01); *G09G 2320/0247* (2013.01); *G09G 2320/0257* (2013.01); *G09G 2330/021* (2013.01)

(56) References Cited

U.S. PATENT DOCUMENTS

| | | | | |
|---|---|---|---|---|
| 9,269,295 | B2 * | 2/2016 | Kim | G09G 3/3233 |
| 9,721,508 | B2 * | 8/2017 | Sun | G09G 3/3258 |
| 10,446,080 | B2 * | 10/2019 | Chen | G09G 3/3233 |
| 10,613,699 | B2 * | 4/2020 | Thompson | G06F 3/011 |
| 10,714,053 | B2 * | 7/2020 | Zhu | G09G 3/2074 |
| 10,902,779 | B2 * | 1/2021 | Li | G09G 3/3233 |
| 10,916,198 | B2 * | 2/2021 | Lin | G09G 3/3258 |
| 10,997,916 | B2 * | 5/2021 | Zhang | G09G 3/3233 |
| 11,004,385 | B1 * | 5/2021 | Li | G09G 3/3233 |
| 11,587,512 | B2 * | 2/2023 | Zhang | G09G 3/3266 |
| 11,676,528 | B2 * | 6/2023 | Kim | G09G 3/30<br>345/690 |
| 2006/0262130 | A1 * | 11/2006 | Kim | G09G 3/3233<br>345/589 |
| 2014/0028649 | A1 * | 1/2014 | Kim | G09G 3/3233<br>345/212 |
| 2014/0028859 | A1 * | 1/2014 | Kim | G09G 3/30<br>348/189 |
| 2014/0118409 | A1 * | 5/2014 | Jun | G09G 3/3233<br>345/690 |
| 2016/0171938 | A1 * | 6/2016 | Na | G09G 3/3666<br>345/698 |
| 2017/0033237 | A1 * | 2/2017 | Abe | H01L 29/78684 |
| 2017/0110054 | A1 * | 4/2017 | Sun | G09G 3/3291 |
| 2017/0148420 | A1 * | 5/2017 | Gao | G09G 3/20 |
| 2017/0193972 | A1 * | 7/2017 | Gao | G09G 5/003 |
| 2017/0365214 | A1 * | 12/2017 | Tsai | G09G 3/3266 |
| 2018/0019292 | A1 * | 1/2018 | Osame | G09G 3/3233 |
| 2018/0166025 | A1 * | 6/2018 | Zhou | G09G 3/3233 |
| 2019/0122626 | A1 * | 4/2019 | Du | G09G 3/20 |
| 2019/0189053 | A1 * | 6/2019 | Kim | G09G 3/3266 |
| 2019/0272789 | A1 * | 9/2019 | Pyon | H10K 59/1213 |
| 2019/0325845 | A1 * | 10/2019 | Zhu | G09G 3/2074 |
| 2020/0074928 | A1 * | 3/2020 | Li | G09G 3/3233 |
| 2020/0226978 | A1 * | 7/2020 | Lin | H01L 29/7869 |
| 2020/0279524 | A1 * | 9/2020 | Zhang | G09G 3/32 |
| 2020/0312223 | A1 * | 10/2020 | Yuan | G09G 3/32 |
| 2021/0082339 | A1 * | 3/2021 | Zhang | G09G 3/2092 |
| 2021/0125562 | A1 * | 4/2021 | Li | G09G 3/3258 |
| 2021/0134917 | A1 * | 5/2021 | Li | G09G 3/3266 |
| 2021/0150985 | A1 * | 5/2021 | Li | G09G 3/3233 |
| 2021/0158755 | A1 * | 5/2021 | Li | G09G 3/3233 |
| 2021/0193033 | A1 * | 6/2021 | Tan | G09G 3/3225 |
| 2021/0193055 | A1 * | 6/2021 | Lee | G09G 3/3291 |
| 2021/0193691 | A1 * | 6/2021 | Lee | G09G 3/3233 |
| 2021/0217363 | A1 * | 7/2021 | Gao | G09G 3/2092 |
| 2021/0248959 | A1 * | 8/2021 | Kim | G09G 3/3233 |
| 2021/0350745 | A1 * | 11/2021 | Huang | G09G 3/3233 |
| 2021/0383743 | A1 * | 12/2021 | Yuan | G09G 3/32 |
| 2021/0407383 | A1 * | 12/2021 | Lai | G09G 3/32 |
| 2021/0407384 | A1 * | 12/2021 | Yuan | G09G 3/32 |
| 2021/0407386 | A1 * | 12/2021 | Li | G09G 3/3233 |
| 2022/0208074 | A1 * | 6/2022 | Kim | G09G 3/3241 |
| 2022/0335890 | A1 * | 10/2022 | Li | G09G 3/3233 |
| 2022/0358883 | A1 * | 11/2022 | Li | G09G 3/3266 |
| 2022/0392403 | A1 * | 12/2022 | Yamamoto | G11C 19/28 |
| 2024/0212616 | A1 * | 6/2024 | Eun | G09G 3/3233 |
| 2024/0221682 | A1 * | 7/2024 | Kim | G09G 3/3266 |

FOREIGN PATENT DOCUMENTS

| | | | |
|---|---|---|---|
| CN | 110148610 | A | 8/2019 |
| CN | 110858471 | A | 3/2020 |
| CN | 111462694 | A | 7/2020 |

* cited by examiner

DISPLAY PANEL

CROSS-REFERENCE TO RELATED APPLICATION

This application is a continuation-in-part of U.S. application Ser. No. 17/164,019 filed on Feb. 1, 2021, which claims priority to Chinese Patent Application No. 202011104618.4 filed on Oct. 15, 2020, and the entirety of each of which is incorporated herein by reference.

TECHNICAL FIELD

The present disclosure relates to the field of display panels and, in particular, to a display panel.

BACKGROUND

An organic light-emitting display device has advantages such as self-luminescence, a low drive voltage, a high luminescence efficiency, a fast response speed, lightness and thinness, and a high contrast ratio and is considered to be one of the most promising display devices of the next generation.

A pixel in the organic light-emitting display device includes a pixel driving circuit. The drive transistor in the pixel driving circuit may generate a drive current, and a light-emitting element emits light in response to the drive current. However, factors such as operational techniques and device aging may lead to transistor's threshold value drift, affecting the drive current. Moreover, the hysteresis effect at the times of image switching between high grayscales and low grayscales may lead to an afterimage and a non-uniform brightness of images in the first several frames after the image switching, which causes user's eyes to perceive flickers.

SUMMARY

Embodiments of the present disclosure provide a display panel to solve the flicker problem caused by the hysteresis effect of a drive transistor.

In a first aspect, embodiments of the present disclosure provide a display panel including a pixel driving circuit.

The pixel driving circuit includes a drive transistor, a data write module, a light emission control module, a threshold compensation module and a bias adjustment module. The control terminal of the drive transistor is connected to a first node. The first terminal of the drive transistor is connected to a third node. The second terminal of the drive transistor is connected to a second node. The data write module is configured to provide a data signal to the drive transistor. The light emission control module is connected in series with the drive transistor and connected in series with a light-emitting element and is configured to control whether a drive current flows through the light-emitting element. The threshold compensation module is connected in series between the control terminal of the drive transistor and the second terminal of the drive transistor and configured to detect and self-compensate for the threshold voltage drift of the drive transistor.

The first terminal of the bias adjustment module is connected to a bias signal terminal. The second terminal of the bias adjustment module is connected to the second terminal of the drive transistor. The control terminal of the bias adjustment module is connected to a first control signal terminal. The bias adjustment module is configured to adjust, under the control of a first control signal inputted through the first control signal terminal and a bias signal inputted through the bias signal terminal, the bias state of the drive transistor.

An ith pixel row and an (i+1)th pixel row form a pixel row group, and an (i+2)th pixel row and an (i+3)th pixel row form a pixel row group, a first control signal of the ith pixel row and a first control signal of the (i+1)th pixel row are each provided by a nth stage of first shift register, and a first control signal of the (i+2)th pixel row and a first control signal of the (i+3)th pixel row are each provided by a (n+1)th stage of first shift register, wherein each of i and n is a positive integer; and first control signal terminal is connected to the first shift register and the bias signal terminal is connected a third shift register.

DETAILED DESCRIPTION

Figure 1:
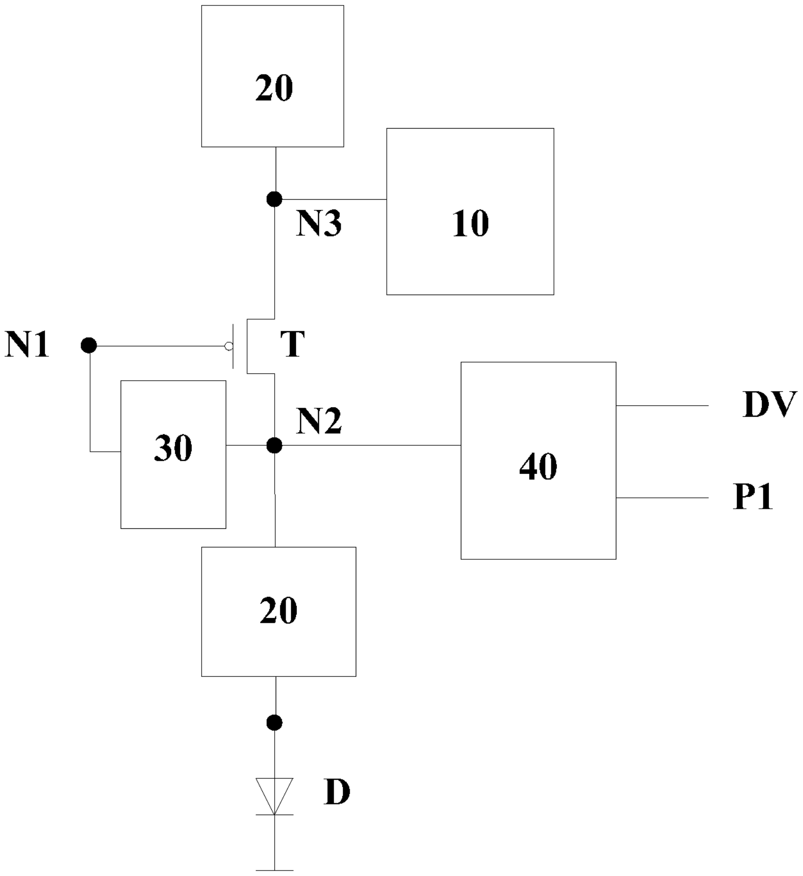
FIG. 1 is a schematic circuit diagram of a pixel driving circuit according to some embodiments of the present disclosure.

The present disclosure is further described in detail hereinafter in connection with drawings and embodiments. It is to be understood that the embodiments described herein are intended to illustrate and not to limit the present disclosure. It is to be noted that to facilitate description, only part, not all, of structures related to the present disclosure are illustrated in the drawings.

Embodiments of the present disclosure provide a pixel driving circuit. FIG. 1 is a schematic circuit diagram of a pixel driving circuit according to some embodiments of the present disclosure. As shown in FIG. 1, the pixel driving circuit includes a drive transistor T, a data write module 10, a light emission control module 20, a threshold compensation module 30 and a bias adjustment module 40. The control terminal of the drive transistor T is connected to a first node N1. The first terminal of the drive transistor T is connected to a third node N3. The second terminal of the drive transistor T is connected to a second node N2. The data write module 10 is configured to provide a data signal to the drive transistor T. The light emission control module 20 is connected in series with the drive transistor T and a light-emitting element D respectively and is configured to control whether a drive current flows through the light-emitting element D.

The threshold compensation module 30 is connected in series between the control terminal of the drive transistor T and the output terminal of the drive transistor T and configured to detect and self-compensate for the threshold voltage drift of the drive transistor T. The pixel driving circuit controls, through a voltage at the control terminal of the drive transistor T, a drive current for driving the light-emitting element D to emit light. However, factors such as techniques and aging lead to the mobility decay and the threshold value Vth drift of the drive transistor, and drive transistors in different pixel driving circuits have different characteristics. As a result, display non-uniformity occurs on the display panel. In this embodiment of the present disclosure, the threshold compensation module 30 detects and self-compensates for the threshold voltage deviation of the drive transistor, alleviating or even eliminating the effect of the threshold voltage on the drive current, thereby preventing the non-uniformity and drift of the threshold voltage from affecting the drive current flowing through the light-emitting element, thereby effectively improving the uniformity of the drive current flowing through the light-emitting element.

The first terminal of the bias adjustment module 40 is connected to a bias signal terminal DV. The second terminal of the bias adjustment module 40 is connected to the output terminal of the drive transistor T. The control terminal of the bias adjustment module 40 is connected to a first control signal terminal P1. The bias adjustment module 40 is configured to adjust, under the control of a first control signal inputted through the first control signal terminal P1 and a bias signal inputted through the bias signal terminal DV, the bias state of the drive transistor.

During displaying in each drive cycle, the gate potential of the drive transistor of the pixel circuit may be greater than the drain potential of the drive transistor in a non-bias stage such as a light emission stage. Such a setting, if performed for a long time, causes ions inside the drive transistor to polarize, thereby forming a built-in electric field inside the drive transistor, causing the threshold voltage of the drive transistor to continuously increase, causing the Id-Vg curve to deviate, thereby affecting the drive current flowing into the light-emitting element, thereby affecting the display uniformity. For example, when a black image is switched to a white image, the display brightness slowly rises and is beginning to stabilize after four to five frames of data are refreshed. Since this recovery time is long, human eyes can perceive flickers.

In this embodiment of the present disclosure, before data writing in each drive cycle, the first control signal inputted to the bias adjustment module 40 through the first control signal terminal P1 and the bias signal inputted to the bias adjustment module 40 through the bias signal terminal DV control the bias adjustment module 40 to transmit the bias signal to the second terminal of the drive transistor T to reversely bias the drive transistor, thereby adjusting the drain potential of the drive transistor T and ameliorating the potential difference between the gate potential of the drive transistor T and the drain potential of the drive transistor T. In some cases, it is feasible to make the gate potential of the drive transistor T lower than the drain potential of the drive transistor T to reduce the degree of ionic polarity inside the drive transistor T and reduce the threshold voltage of the drive transistor T so as to adjust the threshold voltage of the drive transistor T by biasing the drive transistor T. Based on this, in some embodiments, the potential difference between the gate potential of the drive transistor T and the drain potential of the drive transistor T may be adjusted in a bias stage. The effect of this setting on the internal characteristics of the drive transistor T can balance the effect on the internal characteristics of the drive transistor when the gate potential of the drive transistor T is greater than the drain potential of the drive transistor T in the non-bias stage. That is, the decrease in the threshold voltage of drive transistor T in the bias stage can balance the increase in the threshold voltage of the drive transistor T in the non-bias stage. Therefore, it is ensured that the Id-Vg curve does not deviate, and thereby the display uniformity of the display panel is ensured.

In this embodiment of the present disclosure, a description is given by using an example in which the first terminal of the drive transistor is a source, the second terminal of the drive transistor is a drain, and the control terminal of the drive transistor is a gate.

Figure 2:
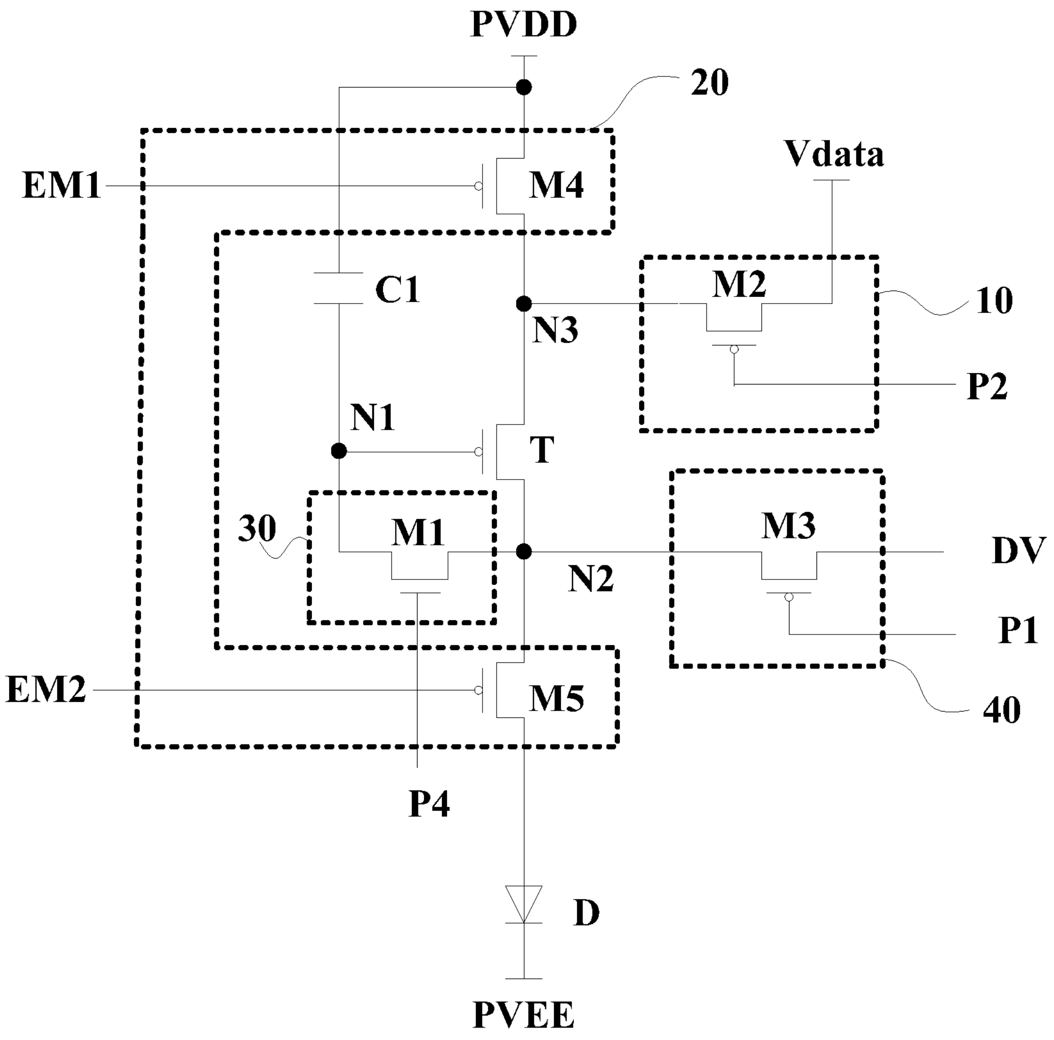
FIG. 2 is a schematic circuit diagram of another pixel driving circuit according to some embodiments of the present disclosure.

Based on the preceding embodiment, in an embodiment, referring to FIG. 2, the threshold compensation module 30 includes a first transistor M1. The control terminal of the drive transistor T and the first terminal of the first transistor M1 are electrically connected to the first node N1. The second terminal of the drive transistor T and the second terminal of the first transistor M1 are electrically connected to the second node N2. In a data write stage, the first transistor M1 is on, which captures the threshold voltage of the drive transistor and writes, to the control terminal of the drive transistor, an electric signal carrying the threshold voltage of the drive transistor.

Based on the preceding embodiment, in an embodiment, an active layer of the first transistor M1 includes an oxide semiconductor. For example, an active layer of the first transistor M1 uses an oxide semiconductor.

The electric potential of the first node N1 needs to be maintained in the light emission stage, so the first transistor M1 may use an oxide semiconductor at a low leakage current level, that is, the active layer of the first transistor M1 may use an oxide semiconductor. In this manner, the first node N1 may be maintained at a stable potential in the light emission stage, thereby avoiding the problem of brightness drop in the light emission stage due to the leakage current of the first transistor M1. In some embodiments, the active layer of the first transistor M1 may use, for example, an indium gallium zinc oxide (IGZO). IGZO is composed of $In_2O_3$, $Ga_2O_3$ and ZnO, has a band gap of about 3.5 eV and is an N-type semiconductor material. In FIG. 2, exemplarily, the first transistor M1 is an N-type transistor.

In an embodiment, an active layer of the drive transistor T, an active layer of a transistor in the data write module 10, an active layer of a transistor in the light emission control module 20, and an active layer of a transistor in the bias adjustment module 40 each include a low-temperature polycrystalline silicon material. The channel width-to-length ratio of the first transistor M1 is greater than the channel width-to-length ratio of the drive transistor T, the channel width-to-length ratio of the transistor in the data write module 10, the channel width-to-length ratio of the transistor in the light emission control module 20, and the channel width-to-length ratio of the transistor in the bias adjustment module 40. The drive capability of a transistor is proportional to the channel width-to-length ratio of the transistor and the mobility of the transistor. The mobility of a low-temperature polycrystalline silicon (LTPS) material is much greater than that of an oxide semiconductor (for example, IGZO), so when the channel width-to-length ratio of an LTPS transistor is equivalent to the channel width-to-length ratio of an IGZO transistor, the drive capability of the IGZO transistor is much smaller than that of the LTPS transistor and thus becomes a key constraint in improving the pixel resolution of the display panel. In this embodiment of the present disclosure, the channel width-to-length ratio of the first transistor M1, when using the oxide semiconductor, is set to be greater than the channel width-to-length ratio of an LTPS transistor, so that the drive capability of the first transistor M1 can be improved to match the drive capability of the LTPS transistor, thereby ameliorating the weakness in the bucket effect.

In an embodiment, the data write module 10 may include a second transistor M2. The control terminal of the second transistor M2 is electrically connected to a second control signal terminal P2. The first terminal of the second transistor M2 is electrically connected to a data signal terminal Vdata. The second terminal of the second transistor M2 and the first terminal of the drive transistor T are electrically connected to the third node N3. In the data write stage, under the control of a second control signal inputted through the second control signal terminal P2, the second transistor M2 is on and provides the data signal to the drive transistor T.

In an embodiment, the bias adjustment module 40 includes a third transistor M3. The control terminal of the third transistor M3 is electrically connected to the first control signal terminal P1. The first terminal of the third transistor M3 is electrically connected to the bias signal terminal DV. The second terminal of the third transistor M3 is electrically connected to the second node N2.

Before data writing, under the control of the first control signal inputted through the first control signal terminal P1, the third transistor M3 transmits the bias signal, which is inputted through the bias signal terminal DV, to the second terminal of the drive transistor T so that the drive transistor is reversely biased.

In an embodiment, the channel width-to-length ratio of the third transistor M3 is greater than the channel width-to-length ratio of the drive transistor T. The third transistor M3 functioning as a switch requires a fast response speed and a low delay to input the bias signal to the second node N2 fast. Thus, the third transistor M3 requires a relatively small subthreshold swing. For the drive transistor T, the current of each grayscale needs to be accurately controlled, and the current needs to be accurately adjusted through the voltage. Thus, the drive transistor T requires a relatively large subthreshold swing. The larger the channel width-to-length ratio of a transistor, the larger the gate capacitance of the transistor, and the larger the subthreshold swing of the transistor. Therefore, the channel width-to-length ratio of the third transistor M3 is set greater than the channel width-to-length ratio of the drive transistor T in this embodiment of the present disclosure.

In an embodiment, the light emission control module 20 includes a fourth transistor M4 and a fifth transistor M5. The first terminal of the fourth transistor M4 is electrically connected to a first level signal input terminal PVDD. The second terminal of the fourth transistor M4 and the first terminal of the drive transistor T are electrically connected to the third node N3. The first terminal of the fifth transistor M5 is electrically connected to the second node N2. The second terminal of the fifth transistor M5 is electrically connected to the light-emitting element D.

In the first bias adjustment stage and the data write stage, the fourth transistor M4 and the fifth transistor M5 are off. In the light emission stage, the fourth transistor M4 and the fifth transistor M5 are on so that the drive transistor T drives the light-emitting element to emit light.

In an embodiment, the control terminal of the fourth transistor M4 is electrically connected to a first light emission control signal input terminal EM1 and the control terminal of the fifth transistor M5 is electrically connected to a second light emission control signal input terminal EM2. Since the control terminal of the fourth transistor M4 and the control terminal of the fifth transistor M5 are connected to different light emission control signal input terminals, the timing of the input of the first light emission control signal input terminal EM1 and the timing of the input of the second light emission control signal input terminal EM2 may be the same or different. For example, when the control terminal of the drive transistor T is reset, the timing of the input of the second light emission control signal input terminal EM2 controls the fifth transistor M5 to turn on so that the light-emitting element D is also reset.

Figure 3:
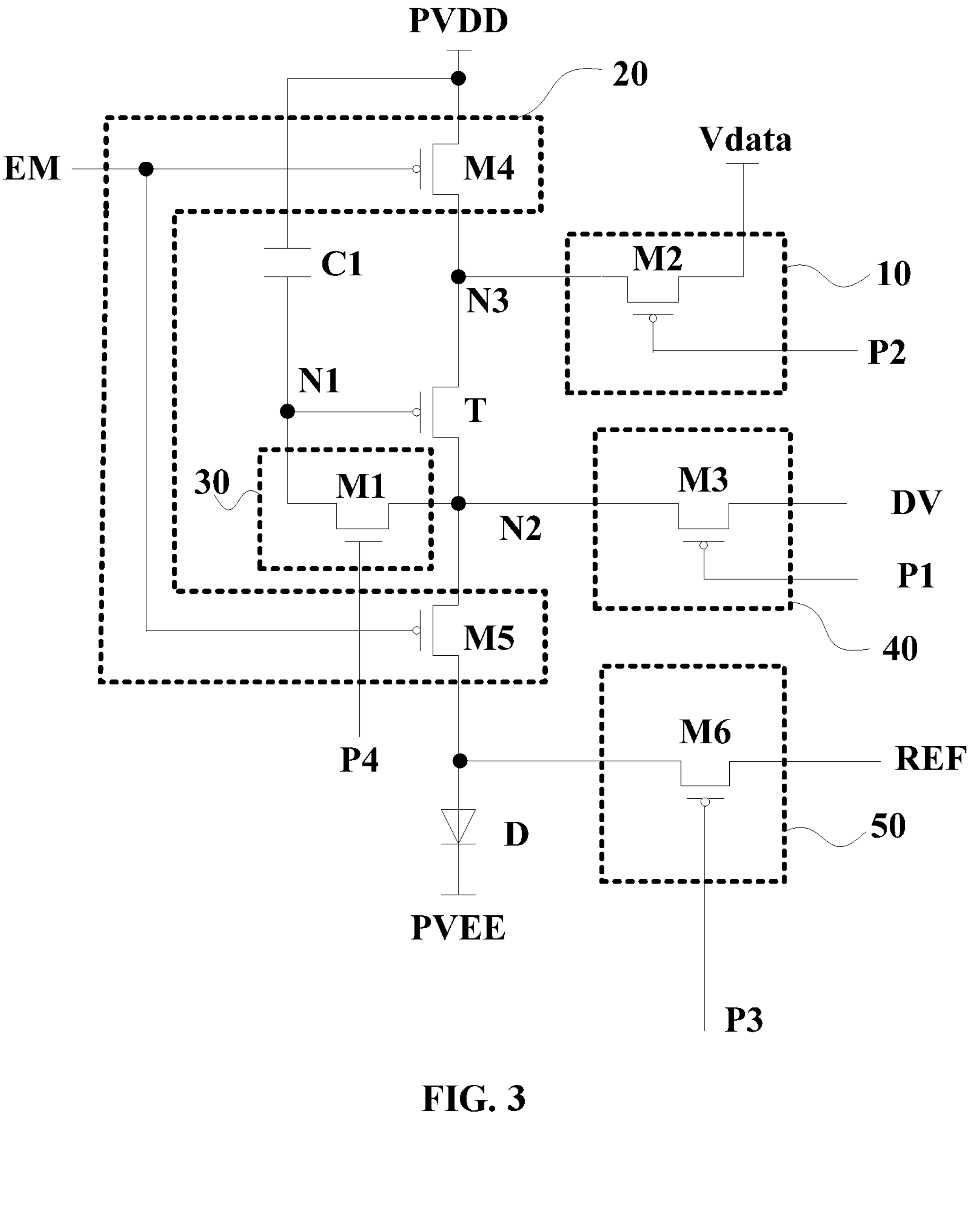
FIG. 3 is a schematic circuit diagram of another pixel driving circuit according to some embodiments of the present disclosure.

In an embodiment, as shown in FIG. 3, the control terminal of the fourth transistor M4 and the control terminal of the fifth transistor M5 may be connected to the same light emission control signal input terminal EM. That is, the fourth transistor M4 and the fifth transistor M5 are controlled by the same light emission control signal to turn on and off. With this configuration, the number of wires in the panel is reduced. Furthermore, for a display panel with a low-frequency display, the flicker restriction caused by the hysteresis effect of the drive transistor are more easily perceived by human eyes due to the low frequency. It is feasible to input a pulse wave, which hops between high levels and low levels, through the light emission control signal input terminal EM in the light emission stage so that the light-emitting element emits light or turns off multiple times in the light emission stage, thereby avoiding flickers perceivable by human eyes. The control terminal of the fourth transistor M4 and the control terminal of the fifth transistor M5 are controlled by the same light emission control signal. Flickers can be alleviated in the situation when this light emission control signal is configured as a pulse wave hopping between high levels and low levels in the light emission stage.

In an embodiment, the pixel driving circuit of this embodiment of the present disclosure further includes a light-emitting element reset module 50. The light-emitting element reset module 50 is electrically connected to the light-emitting element D and configured to reset the light-emitting element D. Before the light emission stage, the electrode voltage on the light-emitting element D may be reset by the light-emitting element reset module 50 so that the potential on the electrode of the light-emitting element D in the previous drive cycle is prevented from affecting the image display in the current drive cycle.

In an embodiment, the control terminal of the light-emitting element reset module 50 is electrically connected to a third control signal terminal P3. The third control signal terminal P3 is electrically connected to the first control signal terminal of a pixel driving circuit in the next pixel row adjacent to the pixel row where the pixel driving circuit is located.

Figure 4:
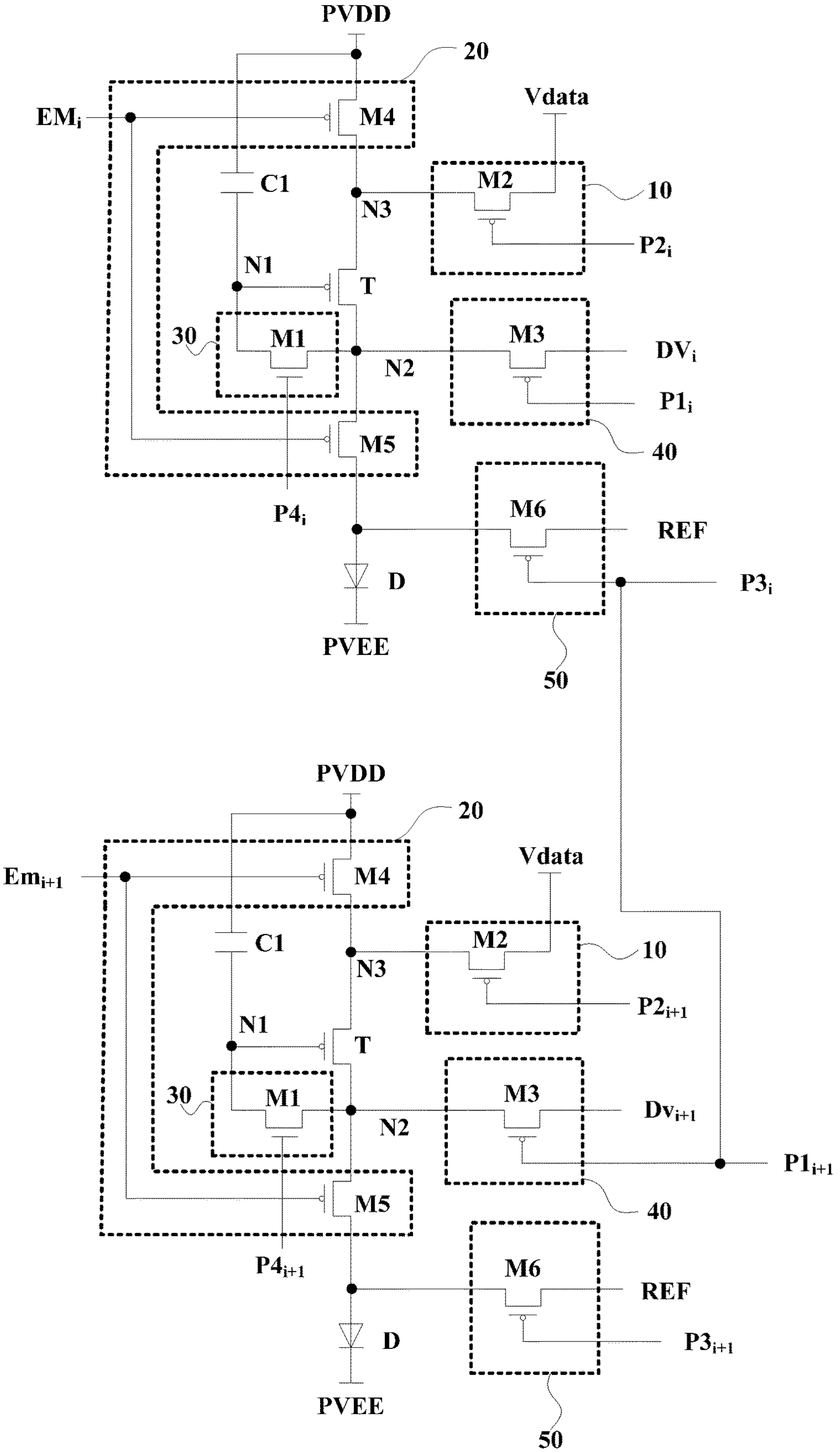
FIG. 4 is a schematic circuit diagram of another pixel driving circuit according to some embodiments of the present disclosure.

The display panel is provided with pixel units arranged in an array, and each of these pixel units includes a pixel driving circuit and a light-emitting element. Therefore, pixel driving circuits in the display panel can be driven in a progressive scanning manner in each drive cycle. Referring to FIG. 4, to reduce the number of signal lines in the display panel, it is feasible to make a third control signal terminal $P3_i$ in a pixel driving circuit in the $i^{th}$ pixel row electrically) connected to a first control signal terminal $P1_{i+1}$ in a pixel driving circuit in the $(i+1)^{th}$ pixel row. When the pixel driving circuit in the $i^{th}$ pixel row resets a light-emitting element, the first bias adjustment stage of the pixel driving circuit in the $(i+1)^{th}$ pixel row is implemented. Here i denotes a positive integer. i and i+1 denote row numbers of the pixel units in the display panel. Since the first control signal terminal $P1_{i+1}$ in the pixel driving circuit in the $(i+1)^{th}$ pixel row has an effective pulse signal for a long time before the light emission stage of the pixel driving circuit in the $i^{th}$ pixel row, it is feasible to make the third control signal terminal $P3_i$ in the pixel driving circuit in the $i^{th}$ pixel row electrically connected to the first control signal terminal in the pixel driving circuit in the $(i+1)^{th}$ pixel row so that the pixel driving circuit in the $i^{th}$ pixel row sufficiently resets the light-emitting element before the light emission stage.

Figure 5:
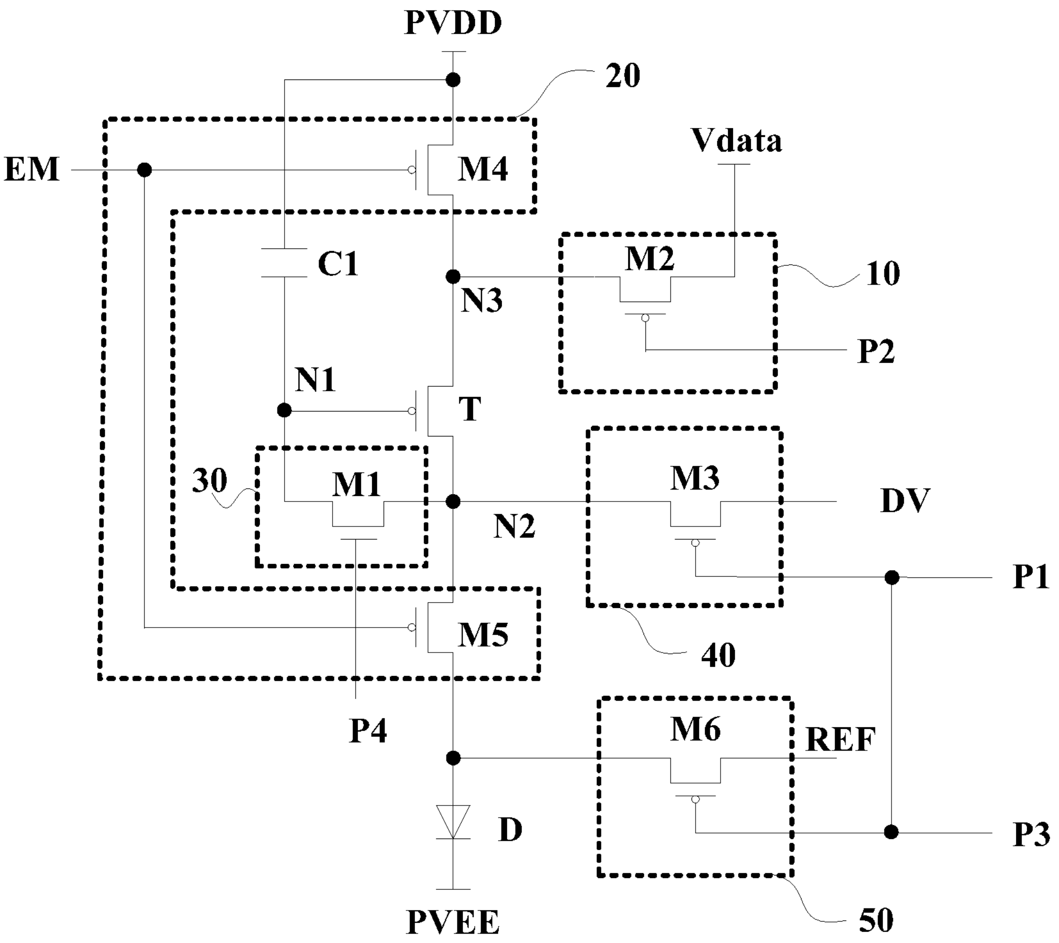
FIG. 5 is a schematic circuit diagram of another pixel driving circuit according to some embodiments of the present disclosure.

In an embodiment, referring to FIG. 5, in this embodiment of the present disclosure, the control terminal of the light-emitting element reset module 50 may be configured to be electrically connected to a third control signal terminal P3. The third control signal terminal P3 is electrically connected to the first control signal terminal P1 of a pixel driving circuit in the current pixel row. That is, the first bias adjustment module 40 and the light-emitting element reset module 50 are controlled by the same signal line to turn on and off.

Figure 6:
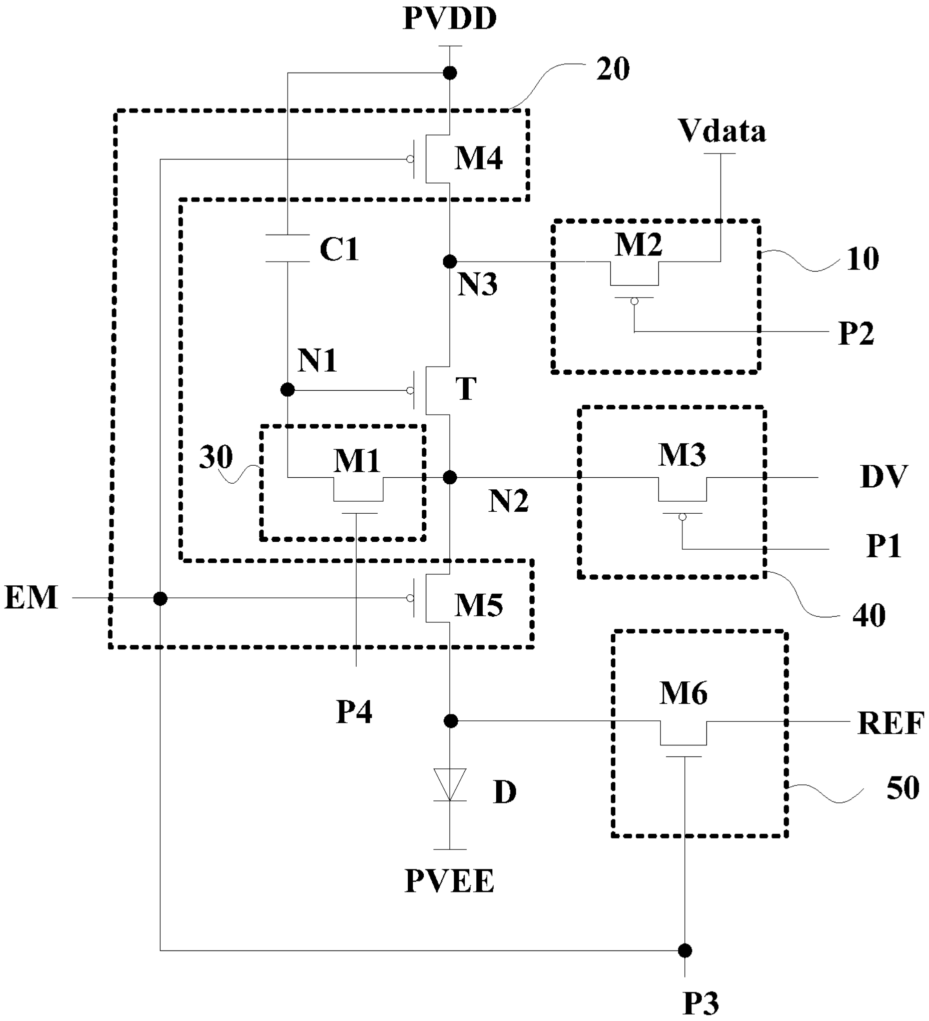
FIG. 6 is a schematic circuit diagram of another pixel driving circuit according to some embodiments of the present disclosure.

In an embodiment, referring to FIG. 6, it is feasible to configure the transistor type in the light-emitting element reset module 50 to be opposite to the transistor type in the light emission control module 20. The control terminal of the light-emitting element reset module 50 is electrically connected to a third control signal terminal P3. The control terminal of the light emission control module 20 is electrically connected to a light emission control signal input terminal EM. The third control signal terminal P3 is electrically connected to the light emission control signal input terminal EM. For example, when a signal inputted through the light emission control signal input terminal EM is at a high level, the transistor type in the light-emitting element reset module 50 is opposite to the transistor type in the light emission control module 20, so the light emission control module 20 is turned off, the light-emitting element reset module 50 is turned on, and the light-emitting element reset module 50 resets the light-emitting element D; when a signal inputted through the light emission control signal input terminal EM is at a low level, the light emission control module 20 is turned on, the light-emitting element reset module 50 is turned off, and the drive transistor T drives the light-emitting element D to emit light.

Moreover, a transistor in the light emission control module 20 may be configured as an LTPS transistor, and a transistor in the light-emitting element reset module 50 may be configured as an oxide semiconductor transistor. The transistor in the light emission control module 20 in the path in which the drive transistor drives the light-emitting element to emit light is configured as the LTPS transistor, and the transistor in the light-emitting element reset module 50 not in the path in which the drive transistor drives the light-emitting element to emit light is configured as the oxide semiconductor transistor, so that the effect of the drive capability of the oxide semiconductor transistor on the overall drive current of the pixel driving circuit can be minimized.

In an embodiment, the light-emitting element reset module 50 may include a sixth transistor M6. The first terminal of the sixth transistor M6 is electrically connected to a reset signal terminal REF. The second terminal of the sixth transistor M6 is electrically connected to the light-emitting element D. When the sixth transistor M6 is turned on under the control of a third control signal inputted through the third control signal terminal P3, the reset signal terminal REF transmits a reset signal to the light-emitting element D so that the light-emitting element D is reset.

In an embodiment, the threshold compensation module 30 and the bias adjustment module 40 also serve as drive transistor reset modules for resetting the control terminal of the drive transistor T. In order that the voltage at the control terminal of the drive transistor T in the displayed current frame does not affect the display of the next frame, in this embodiment of the present disclosure, the control terminal of the drive transistor T is reset before the data signal is provided for the drive transistor T. For example, referring to FIG. 7, before the data signal is provided for the drive transistor T, the control threshold compensation module 30 and the bias adjustment module 40 are turned on, and the bias adjustment module 40 provides the reset signal for the control terminal of the drive transistor T.

In an embodiment, for example, referring to FIGS. 3 to 6, the control terminal of the threshold compensation module 50 is electrically connected to a fourth control signal terminal P4; under the control of the first control signal inputted through the first control signal terminal P1 and a fourth control signal inputted through the fourth control signal terminal P4, the drive transistor reset modules (the threshold compensation module 30 and the bias adjustment module 40) transmit reset signals to the control terminal of the drive transistor T.

In an embodiment, for example, referring to FIG. 3, in this embodiment, a storage capacitor C1 is further included for maintaining the potential at the first node N1. It is noted that transistor types in the modules in the pixel driving circuit are not limited in this embodiment of the present disclosure. For example, transistors in the modules in the pixel driving circuit may all be N-type transistors or may all be P-type transistors; or according to the actual requirements, some of the transistors may be N-type transistors, and some of the transistors may be P-type transistors. For example, referring to FIG. 3, the first transistor M1 is configured to be N-type and other transistors are all configured to be P-type.

Embodiments of the present disclosure further provide a display panel. The display panel includes the pixel driving circuit described in any one of the preceding embodiments. Therefore, the display panel of this embodiment of the present disclosure has the advantages described in the preceding embodiments. The details are not repeated here.

Based on the preceding embodiments, the display panel of this embodiment of the present disclosure may further include, for example, multiple pixel units. Each pixel unit includes multiple sub-pixels of different colors. Each sub-pixel includes a light-emitting element and the pixel driving circuit as described in any one of the preceding embodiments. It may be configured that among these sub-pixels, pixel driving circuits of sub-pixels of at least two different colors are connected to different bias signal terminals; pixel driving circuits of sub-pixels of the same color are connected to the same bias signal terminal. Since light-emitting elements of different emitted colors have different light emission lifetimes, different drive currents are required in enabling light-emitting elements of different emitted colors to have the same brightness. Drive transistors have different gate potentials in response to different drive currents, and the degree of threshold drift caused by the hysteresis effect of a drive transistor depends on the voltage difference between the gate of the drive transistor and the drain of the drive transistor, so the hysteresis effects of drive transistors corresponding to light-emitting elements of different emitted colors may lead to different degrees of threshold drift. Therefore, it may be configured in this embodiment of the present disclosure that pixel driving circuits of sub-pixels of at least two different colors are connected to different bias signal terminals; pixel driving circuits of sub-pixels of the same color are connected to the same bias signal terminal. In this manner, compensation can be made for the hysteresis effects of drive transistors of the sub-pixels of different colors.

In an embodiment, the material of the light-emitting element of a blue sub-pixel decays rapidly, because of a short emitting lifetime, and the drive current provided for the blue sub-pixel is relatively large; therefore, the potential at the first node N1 of the pixel driving circuit of the blue sub-pixel is relatively small, and the voltage difference between the first node N1 and the second node N2 in the pixel driving circuit of the blue sub-pixel is less than the voltage difference between the first node N1 and the second node N2 in the pixel driving circuit of each of sub-pixels of other color displays. The degree of threshold drift caused by the hysteresis effect of a drive transistor depends on the voltage difference between the gate of the drive transistor and the drain of the drive transistor (the voltage difference between the first node N1 and the second node N2), so the degree of threshold drift caused by the hysteresis effect of the drive transistor of the pixel circuit of the blue sub-pixel is the smallest. Therefore, in this embodiment of the present disclosure, it is feasible to provide a bias signal having a relatively large voltage value for the bias signal terminal of the pixel driving circuit of a red sub-pixel and the bias signal terminal of the pixel driving circuit of a green sub-pixel so that the bias state of the drive transistor of the pixel driving circuit of the red sub-pixel and the bias state of the drive transistor of the pixel driving circuit of the green sub-pixel can be adjusted to a relatively large extent and so that the threshold drift caused by the hysteresis effect of the drive transistor can be delayed to a relatively large extent; it is feasible to provide a bias signal having a relatively small voltage value for the bias signal terminal of the pixel driving circuit of the blue sub-pixel so that the bias state of the drive transistor of the pixel driving circuit of the blue sub-pixel can be adjusted to a relatively small extent. That is, the bias signal transmitted through the bias signal terminal connected to the pixel driving circuit of the blue sub-pixel is the smallest among the sub-pixels of different colors when the drive transistor is controlled to be reversely biased. In this manner, the accuracy of the bias adjustment of the drive transistor in the pixel driving circuit of each of the sub-pixels of different colors can be ensured.

In another embodiment of the present disclosure, compensation may be made for the hysteresis of drive transistors of the sub-pixels of different colors through the control of the reverse-bias time of the drive transistors. For example, pixel driving circuits of sub-pixels of at least two different colors in the same row are connected to different first control signal terminals; pixel driving circuits of sub-pixels of the same color in the same row are connected to the same first control signal terminal.

Referring to the description in the preceding embodiment, the degree of threshold drift caused by the hysteresis effect of the drive transistor of the pixel circuit of a blue sub-pixel is the smallest among the sub-pixels of different colors. Therefore, it may be configured that the duration of the first bias adjustment stage of the pixel driving circuit of a blue sub-pixel is the shortest among the sub-pixels of different colors when the drive transistor is controlled to be reversely biased, that is, the duration of the first bias adjustment stage is the shortest. In this embodiment of the present disclosure, when the drive transistor is controlled to be reversely biased, it is feasible to provide the effective pulse of the first control signal for the first control signal terminal of the pixel driving circuit of a red sub-pixel and the first control signal terminal of the pixel driving circuit of a green sub-pixel for a relatively long time so that the bias state of the drive transistor of the pixel driving circuit of the red sub-pixel and the bias state of the drive transistor of the pixel driving circuit of the green sub-pixel can be adjusted to a relatively large extent and so that the threshold drift caused by the hysteresis effect of the drive transistor can be delayed to a relatively large extent; it is feasible to provide the effective pulse of the first control signal for the first control signal terminal of the pixel driving circuit of the blue sub-pixel for a relatively short time so that the bias state of the drive transistor of the pixel driving circuit of the blue sub-pixel can be adjusted to a relatively small extent. In this manner, the accuracy of the bias adjustment of the drive transistor in the pixel driving circuit of each of the sub-pixels of different colors can also be ensured.

Figure 7:
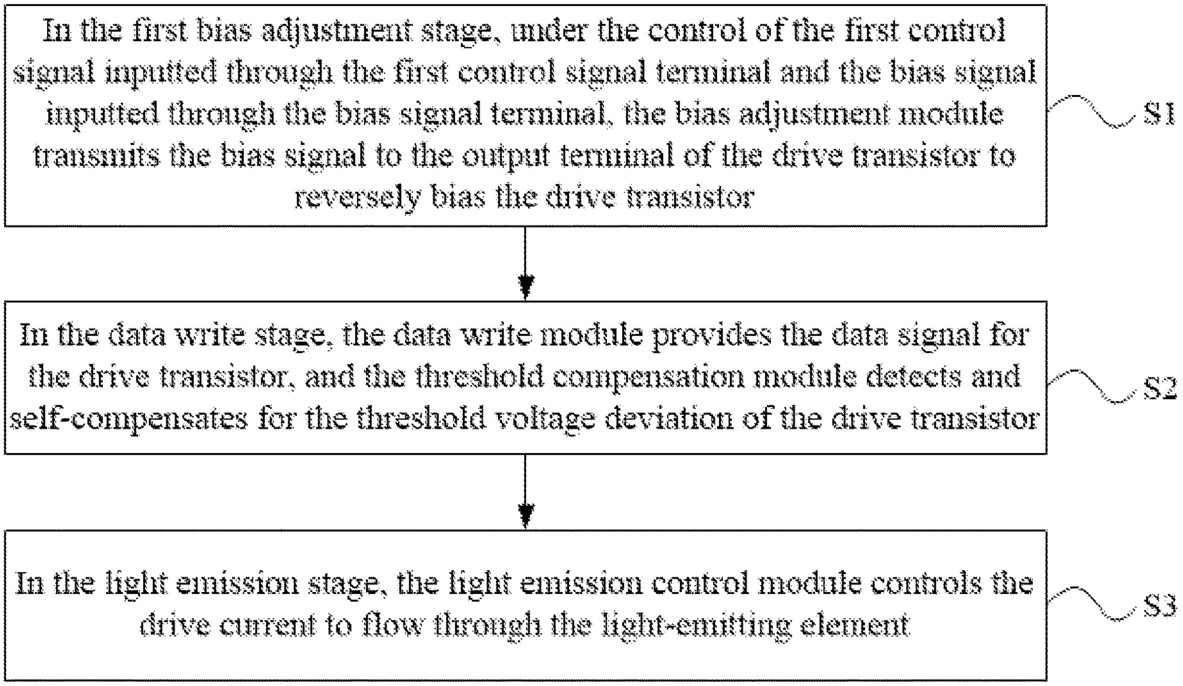
FIG. 7 is a flowchart of a driving method of a display panel according to some embodiments of the present disclosure.
Figure 8:
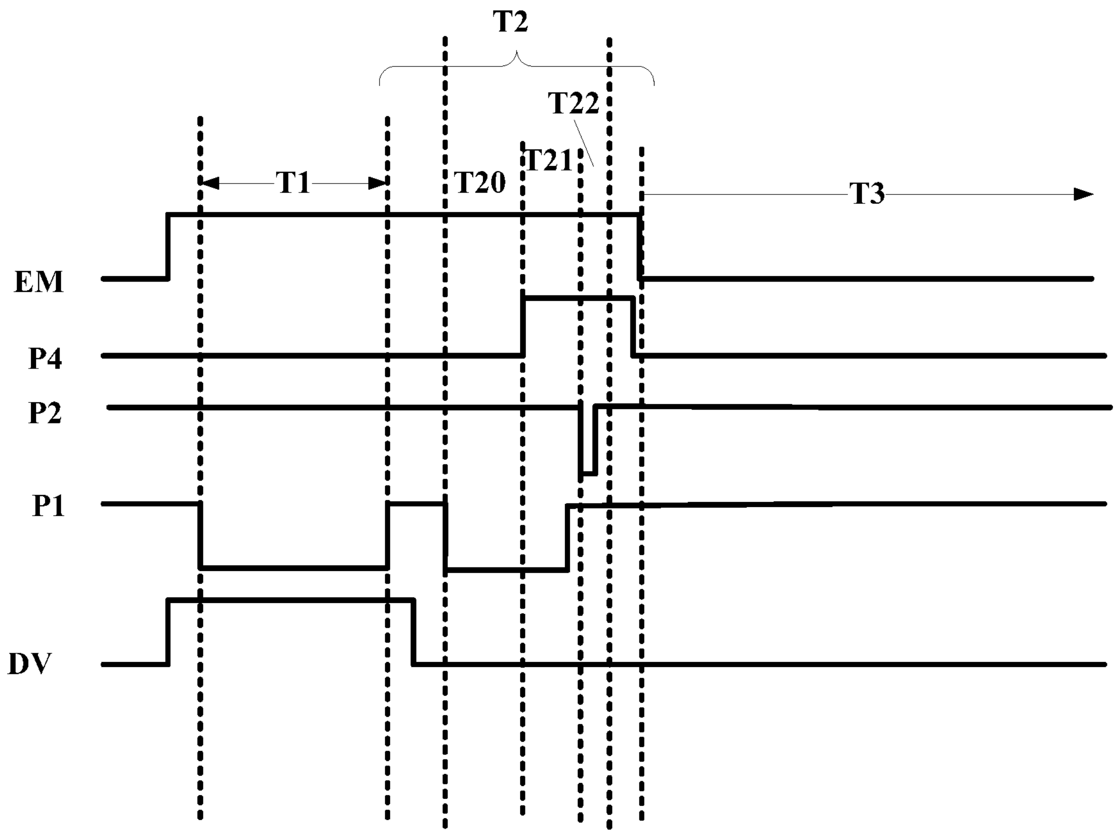
FIG. 8 is a drive timing diagram of a display panel according to some embodiments of the present disclosure.

Based on the same inventive concept, embodiments of the present disclosure further provide a driving method of a display panel. FIG. 7 is a flowchart of a driving method of a display panel according to embodiments of the present disclosure. FIG. 8 is a drive timing diagram of a display panel according to embodiments of the present disclosure. In embodiments of the present disclosure, the drive cycle of the display panel includes a first bias adjustment stage T1, a data write stage T2 and a light emission stage T3.

In S1, in the first bias adjustment stage, under the control of the first control signal inputted through the first control signal terminal and the bias signal inputted through the bias signal terminal, the bias adjustment module transmits the bias signal to the output terminal of the drive transistor to reversely bias the drive transistor.

In S2, in the data write stage, the data write module provides the data signal to the drive transistor, and the threshold compensation module detects and self-compensates for the threshold voltage deviation of the drive transistor.

In S3, in the light emission stage, the light emission control module controls the drive current to flow through the light-emitting element.

In this embodiment of the present disclosure, a first bias adjustment stage is set before the data write stage of each drive cycle. In the first bias adjustment stage, through the first control signal inputted to the bias adjustment module 40 from the first control signal terminal P1 and the bias signal inputted to the bias adjustment module 40 from the bias signal terminal DV, the drain potential of the drive transistor T is adjusted and the potential difference between the gate potential of the drive transistor T and the drain potential of the drive transistor T is ameliorated. In some cases, it is feasible to make the gate potential of the drive transistor T lower than the drain potential of the drive transistor T to reduce the degree of ionic polarity inside the drive transistor T and reduce the threshold voltage of the drive transistor T so as to be able to adjust the threshold voltage of the drive transistor T by biasing the drive transistor T. Based on this, in some embodiments, the potential difference between the gate potential of the drive transistor T and the drain potential of the drive transistor T may be adjusted in a bias stage. The effect of this setting on the internal characteristics of the drive transistor T can balance the effect on the internal characteristics of the drive transistor, when the gate potential of the drive transistor T is greater than the drain potential of the drive transistor Tin the non-bias stage. That is, the decrease in the threshold voltage of the drive transistor T in the bias stage can balance the increase in the threshold voltage of the drive transistor T in the non-bias stage. Therefore, it is ensured that the Id-Vg curve does not drift, and thereby the display uniformity of the display panel is ensured.

The working process of the pixel circuit of this embodiment is described in detail through the steps below hereinafter in connection with FIGS. 3, 7 and 8.

In S1, in the first bias adjustment stage T1, the first control signal P1 is configured to be at an effective level, and the bias signal DV is configured to be at a high level; the third transistor M3 is on under the control of the first control signal P1, transmits the bias signal DV to the second node N2, and transmits the bias signal to the second terminal of the drive transistor T so that the drive transistor is reversely biased and so that the gate potential of the drive transistor T is lower than the drain potential of the drive transistor T.

In S2, in part of the time period of the data write stage T2, the second control signal P2 is at an effective level, the second transistor M2 is on under the control of the second control signal P2, and the fourth control signal P4 is at an effective level so that the first transistor M1 is also turned on; the data signal at the data signal terminal Vdata is written to the control terminal of the drive transistor T, that is, the first node N1, through the second transistor M2, the drive transistor T and the first transistor M1 in sequence until the drive transistor T is turned off when the voltage difference between the control terminal of the drive transistor T and the first terminal of the drive transistor T is equal to the threshold voltage of the drive transistor T.

In S3, in the light emission stage T3, the light emission control signal EM is at an effective level, the fourth control signal P4, the second control signal P2 and the first control signal P1 are each at an ineffective level, the fourth transistor M4 and the fifth transistor M5 in the light emission control module 20 are on, the first transistor M1, the second transistor M2 and the third transistor M3 are off, and the fourth transistor M4 transmits a first level signal provided by the first level signal input terminal PVDD to the first terminal of the drive transistor T so that the drive transistor T is on and drives the light-emitting element D to emit light.

In this embodiment, in the first bias adjustment stage, the bias adjustment module writes the bias signal to the second terminal of the drive transistor, so that the drive transistor T in the first bias adjustment stage is reversely biased, that is, the voltage at the second terminal of the drive transistor is greater than the voltage at the first terminal of the drive transistor and is also greater than the voltage at the control terminal of the drive transistor. The voltage at the first terminal of the drive transistor may be approximately considered to be the first level inputted through the first level signal input terminal PVDD, so in the first bias adjustment stage, the bias signal written to the second terminal of the drive transistor by the bias adjustment module needs to be greater than the first level inputted through the first level signal input terminal PVDD.

For example, according to the design of the first level voltage of an existing display panel, the voltage range of the bias signal written by the bias adjustment module to the second terminal of the drive transistor is set to 4 V to 10 V.

In an embodiment, in the data write stage T2, the bias adjustment module 40 may further write the bias signal to the second terminal of the drive transistor T to reset the second node N2 so that the control terminal of the drive transistor T is reset when the threshold compensation module 30 is turned on. Therefore, in this embodiment of the present disclosure, the voltage range of the bias signal written by the bias adjustment module to the second terminal of the drive transistor in the data write stage is set to be −1 V to −5 V so that the control terminal of the drive transistor is reset.

Figure 9:
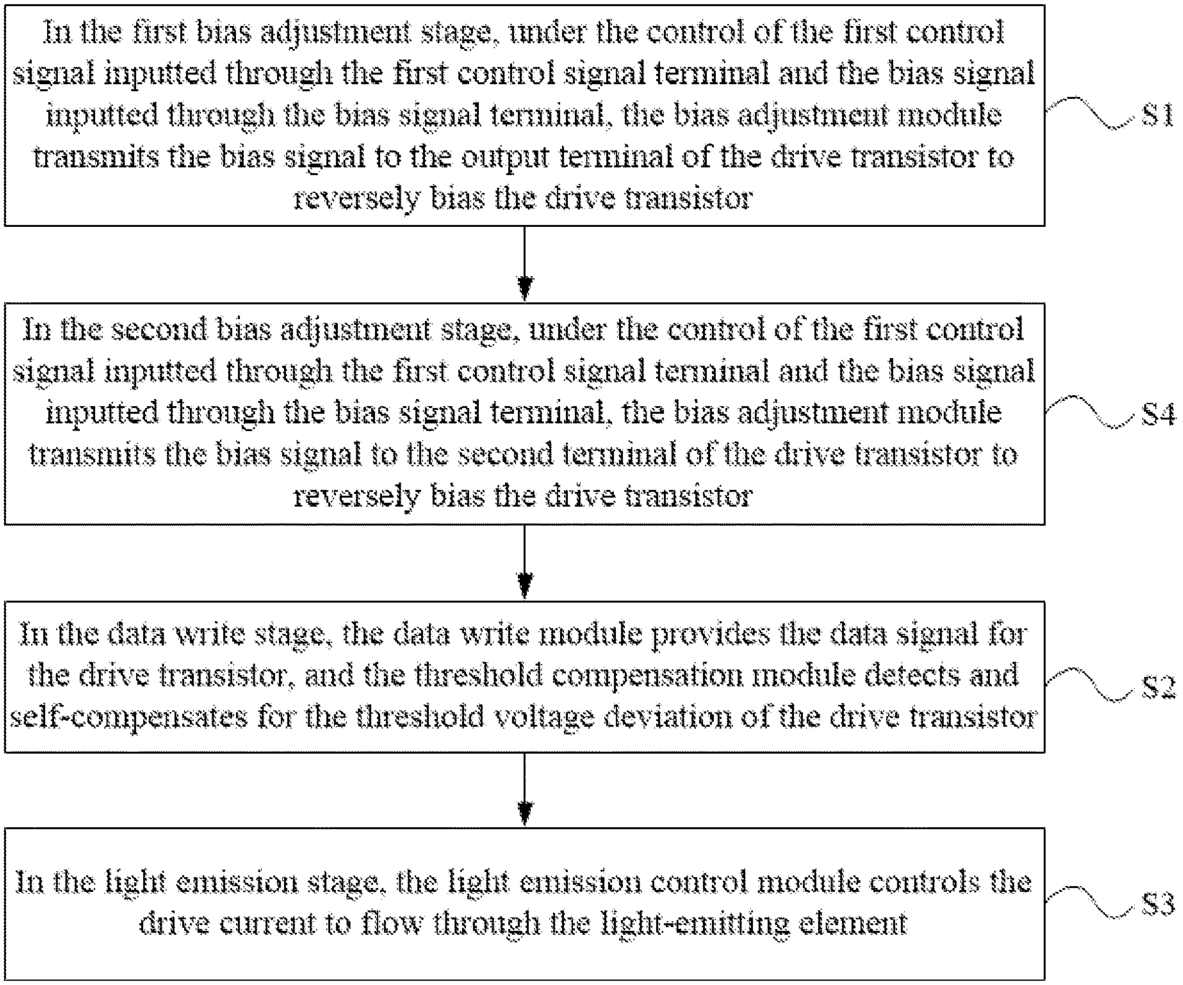
FIG. 9 is a flowchart of another driving method of a display panel according to some embodiments of the present disclosure.
Figure 10:
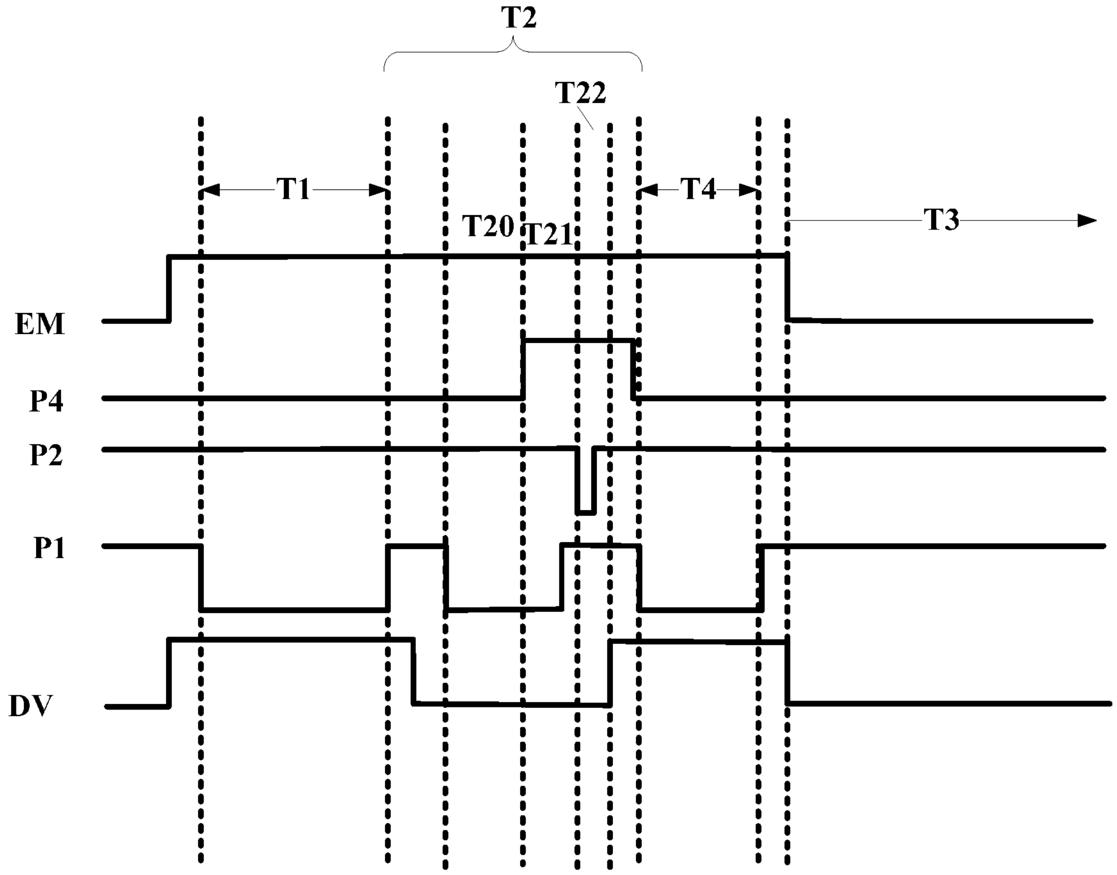
FIG. 10 is another drive timing diagram of a display panel according to some embodiments of the present disclosure.

In an embodiment, FIG. 9 is a flowchart of another driving method of a display panel according to some embodiments of the present disclosure, and FIG. 10 is another drive timing diagram of a display panel according to other embodiments of the present disclosure. In connection with FIGS. 3, 9 and 10, unlike the driving method in the preceding embodiment, in this embodiment of the present disclosure, the drive cycle of the display panel further includes a second bias adjustment stage T4 after the data write stage T2 and before the light emission stage T3. The driving method of a display panel of this embodiment of the present disclosure further includes another step below.

in the second bias adjustment stage, under the control of the first control signal inputted through the first control signal terminal and the bias signal inputted through the bias signal terminal, the bias adjustment module transmits the bias signal to the second terminal of the drive transistor to reversely bias the drive transistor.

In connection with FIG. 10, in the second bias adjustment stage T4, the first control signal P1 is configured to be at an effective level, and the bias signal DV is configured to be at a high level. The third transistor M3 under the control of the first control signal P1, transmits the bias signal DV to the second node N2, and transmits the bias signal to the second terminal of the drive transistor T so that the drive transistor T is reversely biased again.

In the data write stage T2, the threshold voltage of the drive transistor T still varies to a certain extent, which causes the threshold voltage of the drive transistor T unstable at the beginning of the light emission stage, leading to the brightness to vary at the beginning of the light emission stage. Therefore, in this embodiment, the second bias adjustment stage T4 is set between the data write stage T2 and the light emission stage T3. In this manner, the bias adjustment module 40 controls the drain potential of the drive transistor T to be greater than the gate potential of the drive transistor T, the characteristic curve of the drive transistor T is restored to the normal threshold voltage corresponding to data writing in the drive cycle as soon as possible, and thus the brightness is prevented from varying at the beginning of the light emission stage.

Optionally, the duration of the first bias adjustment stage T1 is greater than the duration of the second bias adjustment stage T4. The data write stage T2 of each drive cycle is relatively short, and the threshold drift of the drive transistor is relatively small in this stage, so the duration of the first bias adjustment stage T1 may be set greater than the duration of the second bias adjustment stage T4.

It is discovered that when the ratio of the duration of the first bias adjustment stage T1 to the duration of the second bias adjustment stage T4 is greater than 1.3, a non-uniform brightness of the first several frames after image switching can be significantly suppressed.

In an embodiment, referring to FIG. 8, the data write stage T2 may include a drive transistor control terminal reset sub-stage T21 and a data write sub-stage T22. When the threshold compensation module 30 and the bias adjustment module 40 also serve as drive transistor reset modules, the data write stage T2 may include the drive transistor control terminal reset sub-stage T21 and the data write sub-stage T22.

In the drive transistor control terminal reset sub-stage T21, the threshold compensation module 30 and the bias adjustment module 40 also serve as drive transistor reset modules to reset the control terminal of the drive transistor T.

For example, in FIG. 8, in the drive transistor control terminal reset sub-stage T21, the first control signal P1 is configured to be at an effective level, and the bias signal DV is configured to be at a low level; the third transistor M3 is on under the control of the first control signal P1 and transmits the bias signal DV to the second node N2, the fourth control signal P4 is at an effective level, and the first transistor M1 is on under the control of the fourth control signal P4 and transmits the low level at the second node to the first node N1 so that the control terminal of the drive transistor T is reset.

In the data write sub-stage T22, the data write module 10 provides the data signal to the drive transistor T, and the threshold compensation module 30 detects and self-compensates for the threshold voltage deviation of the drive transistor T. Referring to FIG. 8, in this stage, the second control signal P2 is at an effective level, the second transistor M2 is on under the control of the second control signal P2, and the fourth control signal P4 is at an effective level so that the first transistor M1 is also turned on; the data signal at the data signal terminal Vdata is written to the control terminal of the drive transistor T, that is, the first node N1, through the second transistor M2, the drive transistor T and the first transistor M1 in sequence until the drive transistor T is turned off when the voltage difference between the control terminal of the drive transistor T and the first terminal of the drive transistor T is equal to the threshold voltage of the drive transistor T.

In this embodiment of the present disclosure, the threshold compensation module 30 and the bias adjustment module 40 also serve as drive transistor reset modules so that an additional reset module is not required at the control terminal of the drive transistor, thereby simplifying the pixel driving circuit.

In an embodiment, for example, referring to FIGS. 3 to 6, under the control of the first control signal P1 inputted through the first control signal terminal P1 and a fourth control signal inputted through the fourth control signal terminal P4, the control terminal of the threshold compensation module 50 is electrically connected to a fourth control signal terminal P4; the drive transistor reset modules (the threshold compensation module 30 and the bias adjustment module 40) transmit reset signals to the control terminal of the drive transistor T. Exemplarily, the drive timing is as shown in FIG. 8 in which under the control of the first control signal P1 inputted through the first control signal terminal P1, the bias adjustment module 40 transmits a reset signal to the control terminal of the drive transistor T, and under the control of the fourth control signal inputted through the fourth control signal terminal P4, the threshold compensation module 30 transmits a reset signal to the control terminal of the drive transistor T. Referring to FIG. 9, the bias adjustment module 40 is off under the control of the first control signal P1 inputted through the first control signal terminal P1, the threshold compensation module 30 is on under the control of the fourth control signal inputted through the fourth control signal terminal P4, and the data write module 10 is on under the control of the second control signal inputted through the second control signal terminal P2 and writes the data signal.

In an embodiment, referring to FIG. 8, a drive transistor second terminal reset sub-stage T20 is included before the drive transistor control terminal reset sub-stage T21; and in the drive transistor second terminal reset sub-stage T20, under the control of the first control signal inputted through the first control signal terminal P1 and the bias signal inputted through the bias signal terminal DV, the bias adjustment module 40 transmits the bias signal to the second terminal of the drive transistor T to positively bias the drive transistor T. In FIG. 8, in the drive transistor second terminal reset sub-stage T20, the first control signal P1 is configured to be at an effective level, and the bias signal DV is configured to be at a low level; the third transistor M3 is on under the control of the first control signal P1, and transmits the bias signal DV to the second node N2 to prepare for subsequent reset of the control terminal of the drive transistor T.

In the low-frequency drive mode, the drive time of each drive cycle is relatively long, and the drive transistor is positively biased in terms of fixed potentials for a long time. Thus, the hysteresis effect is more serious, and flickers are more perceivable by human eyes. Therefore, driving may be performed in different modes.

Figure 11:
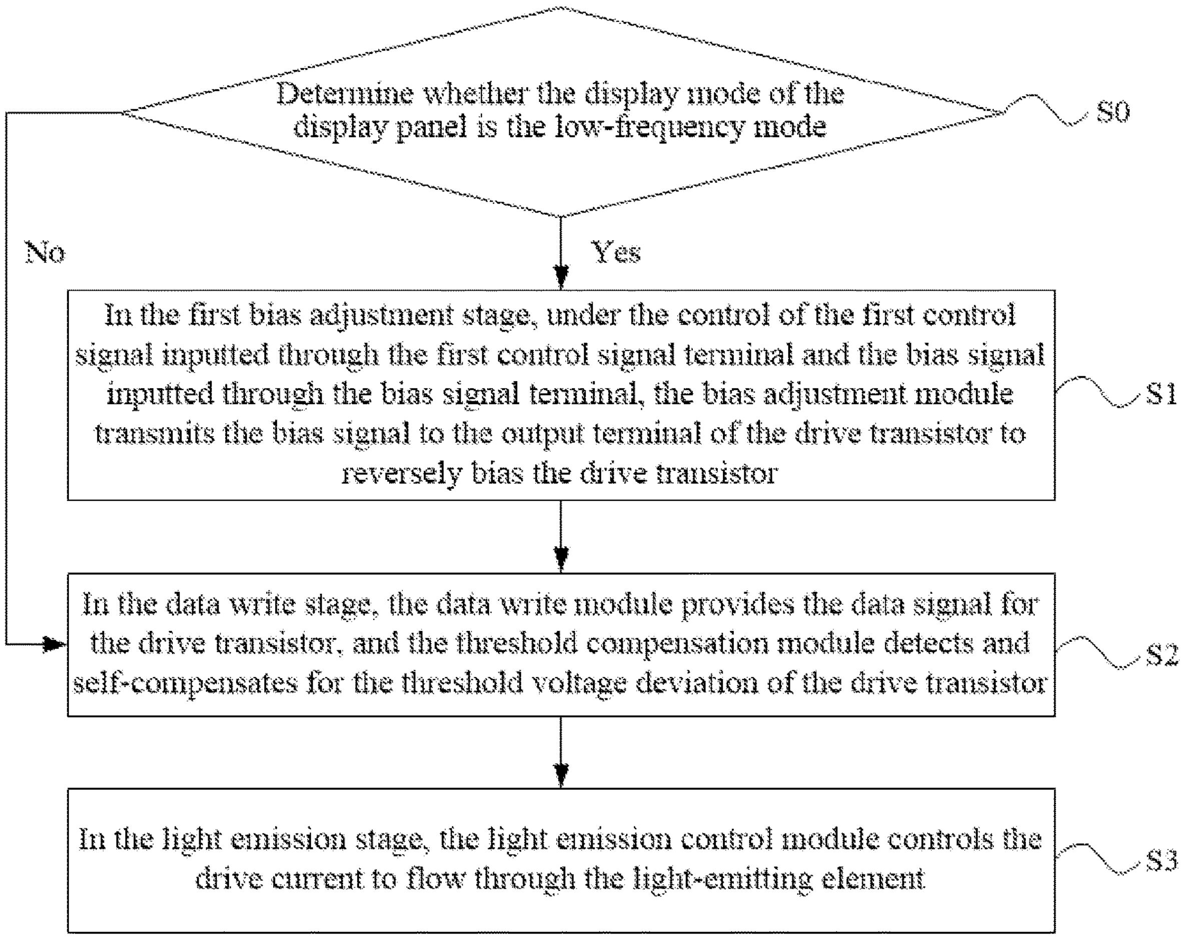
FIG. 11 is a flowchart of another driving method of a display panel according to some embodiments of the present disclosure.

FIG. 11 is a flowchart of another driving method of a display panel according to some embodiments of the present disclosure. Referring to FIG. 11, the method includes the steps below.

In S0, it is determined whether the display mode of the display panel is the low-frequency mode.

If the display mode of the display panel is the low-frequency mode, steps S1 to S3 are performed. Otherwise, steps S2 and S3 are performed.

In the low-frequency drive mode, the drive time of each drive cycle is relatively long, and the drive transistor is positively biased in terms of fixed potentials for a long time. Thus, the hysteresis effect is more serious, and flickers are more perceivable by human eyes. Therefore, driving may be performed in different modes. Accordingly, it is feasible to determine the display mode in this embodiment of the present disclosure before the driving process of any one of the preceding embodiments is performed. When the display mode of the display panel is the low-frequency mode, a first bias adjustment stage is set before the data write stage of each drive cycle, thereby suppressing the flicker problem caused by the hysteresis effect of the drive transistor. Otherwise, the data write stage and the light emission stage are performed in sequence.

Figure 12:
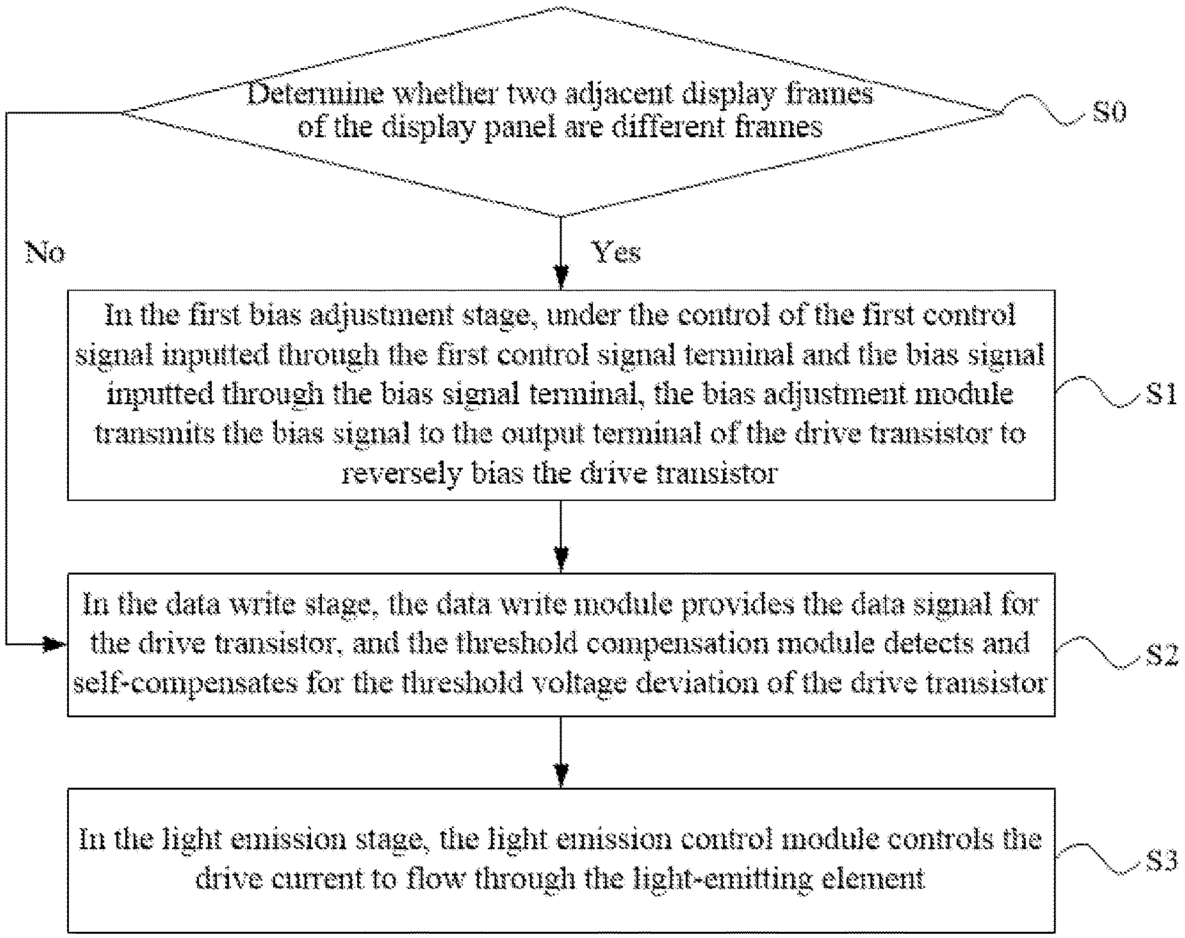
FIG. 12 is a flowchart of another driving method of a display panel according to some embodiments of the present disclosure.

Moreover, if two adjacent display frames of the display panel are the same frame, since data signals of the two frames are the same, the flicker problem caused by the hysteresis effect of the drive transistor can be ignored. Accordingly, embodiments of the present disclosure further provide a flowchart of another driving method of a display panel. Referring to FIG. 12, the method includes the steps below.

In S0, it is determined whether two adjacent display frames of the display panel are different frames.

If Yes, steps S1 to S3 are performed. If No, steps S2 and S3 are performed.

Figure 13:
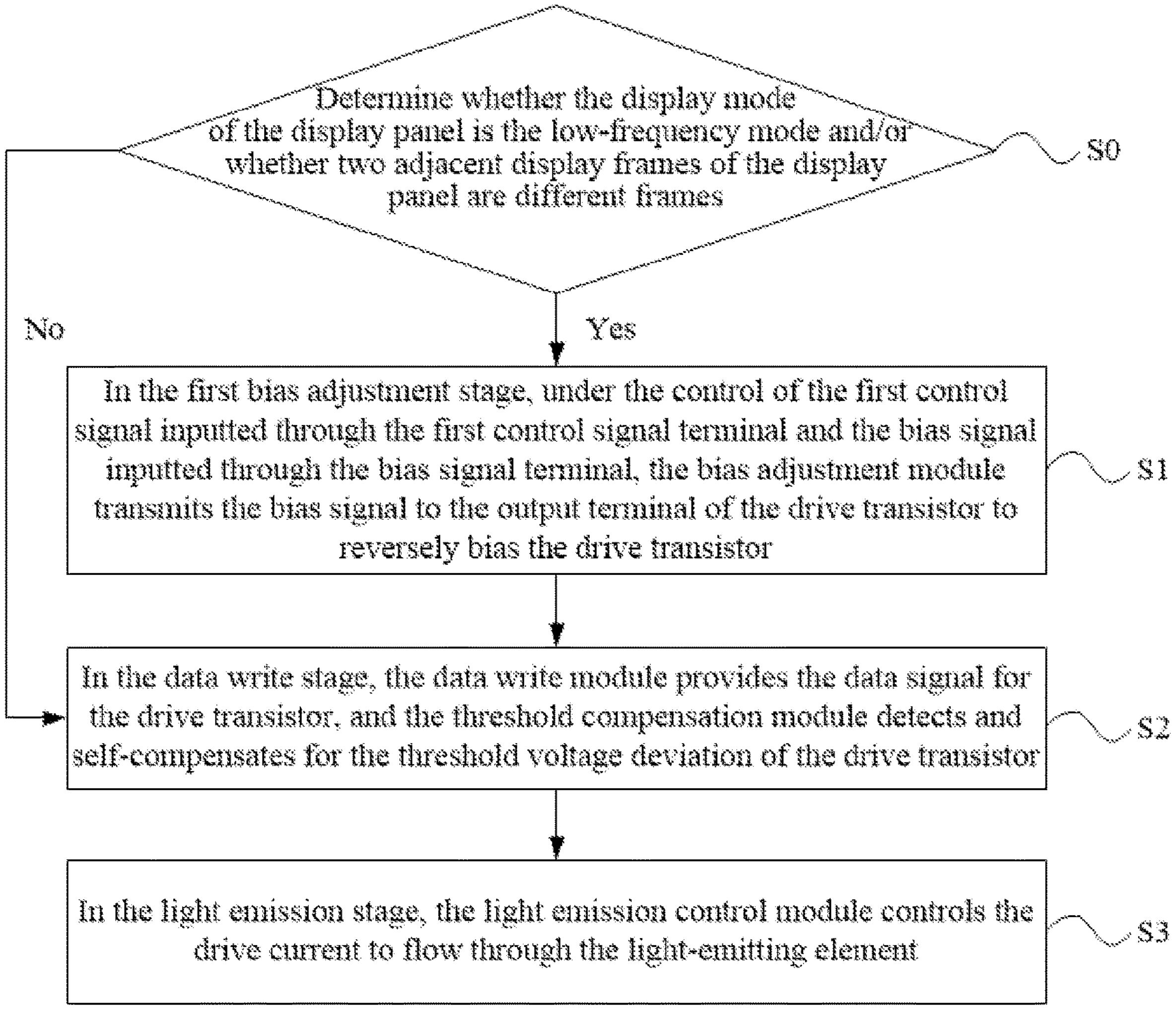
FIG. 13 is a flowchart of another driving method of a display panel according to some embodiments of the present disclosure.

FIG. 13 is a flowchart of another driving method of a display panel according to embodiments of the present disclosure. Referring to FIG. 13, the method includes the steps below.

In S0, it is determined whether the display mode of the display panel is the low-frequency mode and/or whether two adjacent display frames of the display panel are different frames.

If the display mode of the display panel is the low-frequency mode and/or two adjacent display frames of the display panel are different frames, steps S1 to S3 are performed. Otherwise, steps S2 and S3 are performed.

It is feasible to determine the display mode in this embodiment of the present disclosure before the driving process of any one of the preceding embodiments is performed. When the display mode of the display panel is the low-frequency mode and/or two adjacent display frames of the display panel are different frames, a first bias adjustment stage is set before the data write stage of each drive cycle, thereby suppressing the flicker problem caused by the hysteresis effect of the drive transistor. Otherwise, the data write stage and the light emission stage are performed in sequence.

In an embodiment, when the frame refresh rate of the display device is less than or equal to 30 Hz, it is determined that the display mode of the display device is the low-frequency mode; when the frame refresh rate of the display device is greater than 60 Hz, it is determined that the display mode of the display device is the high-frequency drive mode. It is to be understood that those skilled in the art may classify the frame refresh rates of the display device according to the actual situation of the product. The classification is not limited to the following case: when the frame refresh rate of the display device is less than or equal to 30 Hz, it is determined that the display mode of the display device is the low-frequency mode; and when the frame refresh rate of the display device is greater than 60 Hz, it is determined that the display mode of the display device is the high-frequency mode.

In an embodiment, in this embodiment of the present disclosure, the light emission stage T3 of each drive cycle may be configured to include multiple light emission sub-stages T31 and multiple light emission cutoff stages T32. The duration of a light emission sub-stage in the light emission stage is controlled so that the display brightness of the light-emitting element is adjusted. That is, the light emission time of the light-emitting element is adjusted using the pulse width modulation (PWM) method. For example, referring to FIG. 13 for method steps and 14 for time lines, in each light emission sub-stage T31 of the light emission stage T3, step S3 is performed in which the light emission control module controls the drive current to flow through the light-emitting element; in each light emission cutoff stage T32, step S1 is performed in which under the control of the first control signal inputted through the first control signal terminal P1 and the bias signal inputted through the bias signal terminal DV, the bias adjustment module reversely biases the drive transistor.

Specifically, in the driving method of this embodiment of the present disclosure, each drive cycle includes a first bias adjustment stage T1, a data write stage T2 and a light emission stage T. The light emission stage T3 includes multiple light emission sub-stages T31 and multiple light emission cutoff stages T32. In the first bias adjustment stage T1 and each light emission cutoff stage T32, the first control signal P1 is configured to be at an effective level, and the bias signal DV is configured to be at a high level; the third transistor M3 is on under the control of the first control signal P1, transmits the bias signal DV to the second node N2, and transmits the bias signal to the second terminal of the drive transistor T so that the drive transistor is reversely biased, thereby suppressing the hysteresis effect of the drive transistor.

In the data write stage T2, the data signal is provided for the drive transistor, and the threshold voltage drift of the drive transistor is detected and self-compensated. For details about the on or off state of each module and the timing of signal lines in the data write stage T2, see the description of FIG. 8. The details are not repeated here.

In each light emission sub-stage T31, the light-emitting element is controlled to emit light. In each light emission sub-stage T31, the light emission control signal EM is at an effective level, the fourth control signal P4, the second control signal P2 and the first control signal P1 are each at an ineffective level, the fourth transistor M4 and the fifth transistor M5 in the light emission control module 20 are on, the first transistor M1, the second transistor M2 and the third transistor M3 are off, and the fourth transistor M4 transmits the first level signal provided by the first level signal input terminal PVDD to the first terminal of the drive transistor T so that the drive transistor T is on and drives the light-emitting element D to emit light.

In this embodiment of the present disclosure, reverse biasing is performed multiple times within the time of one frame, alleviating the hysteresis effect of the drive transistor. Since reverse biasing is performed when the current row of pixel units do not emit light, the overall brightness of the display panel is not affected.

Figure 14:
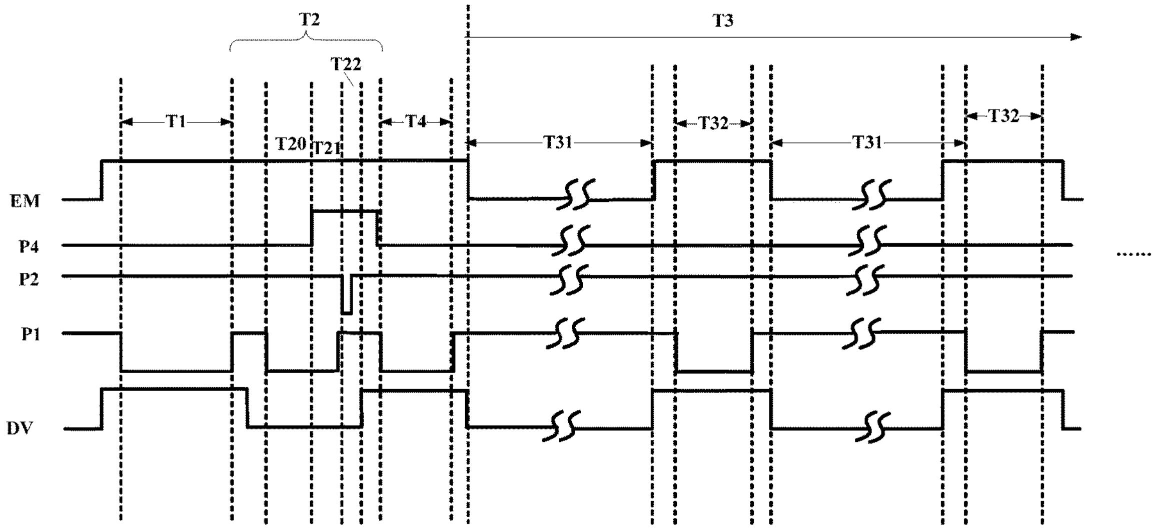
FIG. 14 is another drive timing diagram of a display panel according to some embodiments of the present disclosure.

In an embodiment, referring to FIG. 14, a second bias adjustment stage T4 may be set between the data write stage T2 and the light emission stage T3, thereby reducing the threshold drift of the drive transistor in the data write stage and preventing the brightness from varying at the beginning of the light emission stage. For details about the on or off state of each module and the timing of signal lines in the second bias adjustment stage T4, see the driving process of the second bias adjustment stage T4 in FIG. 8.

It is to be noted that the duration of the light emission cutoff stage T32 may be the same as or different from the duration of the first bias adjustment stage T1.

Figure 15:
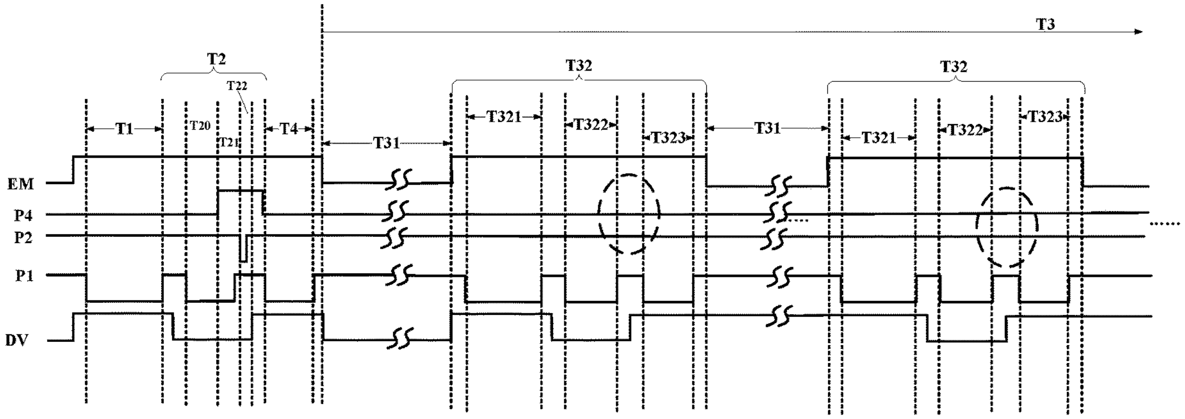
FIG. 15 is another drive timing diagram of a display panel according to some embodiments of the present disclosure.

In an embodiment, in other embodiments, referring to FIG. 15 of time lines, each drive cycle includes a first bias adjustment stage T1, a data write stage T2, a second bias adjustment stage T4 and a light emission stage T3. The light emission stage T3 includes multiple light emission sub-stages T31 and multiple light emission cutoff stages T32. In each light emission sub-stage T31, step S3 from FIG. 13 is performed in which the light emission control module controls the drive current to flow through the light-emitting element. In each light emission cutoff stage T32, steps S1, S6, and S4 are performed in sequence.

In S6, under the control of the first control signal inputted through the first control signal terminal and the bias signal inputted through the bias signal terminal, the bias adjustment module transmits the bias signal to the second terminal of the drive transistor to positively bias the drive transistor.

The working process of the pixel circuit of this embodiment is described in detail hereinafter in connection with FIGS. 3 and 15.

In the first bias adjustment stage T1, the first control signal P1 is configured to be at an effective level, and the bias signal DV is configured to be at a high level; the third transistor M3 is on under the control of the first control signal P1, transmits the bias signal DV to the second node N2, and transmits the bias signal to the second terminal of the drive transistor T so that the drive transistor is reversely biased.

The data write stage T2 includes a drive transistor second terminal reset sub-stage T20, a drive transistor control terminal reset sub-stage T21 and a data write sub-stage T22. In the drive transistor second terminal reset sub-stage T20, the first control signal P1 is configured to be at an effective level, and the bias signal DV is configured to be at a low level; the third transistor M3 is on under the control of the first control signal P1 and transmits the bias signal DV to the second node N2 to prepare for subsequent reset of the control terminal of the drive transistor T. In the drive transistor control terminal reset sub-stage T21, the first control signal P1 is configured to be at an effective level, and the bias signal DV is configured to be at a low level; the third transistor M3 is on under the control of the first control signal P1 and transmits the bias signal DV to the second node N2, the fourth control signal P4 is at an effective level, and the first transistor M1 is on under the control of the fourth control signal P4 and transmits the low level at the second node to the first node N1 so that the control terminal of the drive transistor T is reset. In the data write sub-stage T22, the second control signal P2 is at an effective level, the second transistor M2 is on under the control of the second control signal P2, and the fourth control signal P4 is at an effective level so that the first transistor M1 is also turned on; the data signal at the data signal terminal Vdata is written to the control terminal of the drive transistor T, that is, the first node N1, through the second transistor M2, the drive transistor T and the first transistor M1 in sequence until the drive transistor T is turned off when the voltage difference between the control terminal of the drive transistor T and the first terminal of the drive transistor T is equal to the threshold voltage of the drive transistor T.

In the second bias adjustment stage T4, the first control signal P1 is configured to be at an effective level, and the bias signal DV is configured to be at a high level; the third transistor M3 is on under the control of the first control signal P1, transmits the bias signal DV to the second node N2, and transmits the bias signal to the second terminal of the drive transistor T so that the drive transistor T is reversely biased again.

The light emission stage T3 includes multiple light emission sub-stages T31 and multiple light emission cutoff stages T32.

In each light emission sub-stage T31, the light emission control signal EM is at an effective level, the fourth control signal P4, the second control signal P2 and the first control signal P1 are each at an ineffective level, the fourth transistor M4 and the fifth transistor M5 in the light emission control module 20 are on, the first transistor M1, the second transistor M2 and the third transistor M3 are off, and the fourth transistor M4 transmits the first level signal provided by the first level signal input terminal PVDD to the first terminal of the drive transistor T so that the drive transistor T is on and drives the light-emitting element D to emit light.

Each light emission cutoff stage T32 includes a first stage T321, a second stage T322 and a third stage T323. In the first stage T321, the first control signal P1 is configured to be at an effective level, and the bias signal DV is configured to be at a high level; the third transistor M3 is on under the control of the first control signal P1, transmits the bias signal DV to the second node N2, and transmits the bias signal to the second terminal of the drive transistor T so that the drive transistor is reversely biased. In the second stage T322, the bias signal DV is configured to be at a high level, the first control signal P1 is configured to be at an effective level, and the third transistor M3 is on under the control of the first control signal P1 and transmits the bias signal DV at a low level to the second node N2 so that the drive transistor is positively biased. In the second stage T322, the fourth control signal P4 and the second control signal P2 are each at an ineffective level, and data writing is not performed. In the third stage T323, the first control signal P1 is configured to be at an effective level, and the bias signal DV is configured to be at a high level; the third transistor M3 is on under the control of the first control signal P1, transmits the bias signal DV to the second node N2, and transmits the bias signal to the second terminal of the drive transistor T so that the drive transistor T is reversely biased again. Throughout each light emission cutoff stage T32, the light emission control signal EM is at an ineffective level, so the fourth transistor M4 and the fifth transistor M5 in the light emission control module 20 are off, and the light-emitting element D does not emit light.

That is, in the driving method of this embodiment of the present disclosure, the drive transistor is reversely biased twice before the light emission stage T3 and is also reversely biased twice in each light emission cutoff stage T32 of the light emission stage T3. There is no need to write data again in the light emission stage T3, so it is feasible to provide effective pulses for the second control signal terminal P2 and the fourth control signal terminal P4 in only the data write stage T2, and the second control signal P2 and the fourth control signal P4 do not need to be pulsed in each region indicated by a dashed ellipse in FIG. 15. Therefore, the second control signal P2 and the fourth control signal P4 may be configured to be low-frequency signals when compared to the first control signal P1 so that power consumption can be reduced.

Figure 16:
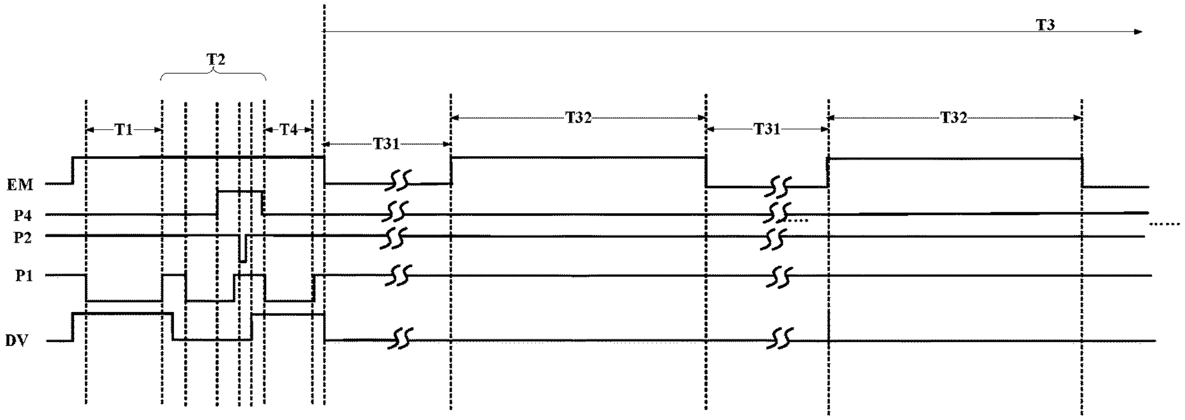
FIG. 16 is another drive timing diagram of a display panel according to some embodiments of the present disclosure.

In an embodiment, in other embodiments, referring to FIG. 16, each drive cycle includes a first bias adjustment stage T1, a data write stage T2 and a light emission stage T3. The light emission stage T3 includes multiple light emission sub-stages T31 and multiple light emission cutoff stages T32. In each light emission sub-stage T31, step S3 is performed in which the light emission control module controls the drive current to flow through the light-emitting element. In each light emission cutoff stage T32, step S7 is performed.

In S7, the bias adjustment module is off under the control of the first control signal inputted through the first control signal terminal.

Referring to FIG. 16, in each light emission cutoff stage T32, the light emission control signal EM is at an ineffective level, the fourth transistor M4 and the fifth transistor M5 in the light emission control module 20 are off, the fourth control signal P4, the second control signal P2 and the first control signal P1 are each at an ineffective level, the first transistor in the threshold compensation module 30, the second transistor M2 in the data write module 10 and the third transistor M3 in the bias adjustment module 40 are off.

That is, in the driving method of this embodiment of the present disclosure, only in the first bias adjustment stage T1 of each drive cycle is the drive transistor reversely biased so that the hysteresis effect of the drive transistor is suppressed; in the data write stage T2, the data signal is provided for the drive transistor, and the threshold voltage drift of the drive transistor is detected and self-compensated; in the light emission stage T3, with multiple light emission sub-stages T31 and multiple light emission cutoff stages T32 included in the light emission stage T3, the light emission duration of the light-emitting element is adjusted, and the bias adjustment module is off in each light emission cutoff stage T32. With this configuration, the pulsing frequency of the first control signal P1, the second control signal P2, the fourth control signal P4 and the bias signal DV can be reduced, and thus the power consumption can be reduced. In an embodiment, referring to FIG. 16, a second bias adjustment stage T4 may be set between the data write stage T2 and the light emission stage T3, thereby reducing the threshold drift of the drive transistor in the data write stage and preventing the brightness from varying at the beginning of the light emission stage.

It is to be noted that in each of the preceding embodiments, in the light emission stage T3, the light emission sub-stages T31 may have the same or different durations, and the light emission cutoff stages T32 may also have the same or different durations.

In FIGS. 15 and 16, the sum of the duration of the first bias adjustment stage T1, the duration of the data write stage T2 and the duration of the second bias adjustment stage T4 is allowed to be the same as or different from the duration of the light emission cutoff stage T32. The sum of the duration of the first bias adjustment stage T1, the duration of the data write stage T2 and the duration of the second bias adjustment stage T4 may be the same as the duration of the light emission cutoff stage T32, facilitating the design of each pulse signal.

In an embodiment, the control terminal of the light emission control module 20 is electrically connected to a light emission control signal input terminal EM; the control terminal of the data write module 10 is electrically connected to a second control signal terminal P2; the control terminal of the threshold compensation module 30 is electrically connected to a fourth control signal terminal P4; in each drive cycle, an ineffective pulse of a light emission control signal inputted through the light emission control signal input terminal EM has a duration of t1, and an effective pulse of the first control signal P1 has a duration of t2; an effective pulse of a fourth control signal inputted through the fourth control signal terminal P4 has a duration of t3; an effective pulse of a second control signal inputted through the second control signal terminal P2 has a duration of t4, where t1>t2>t3>t4.

Referring to FIG. 8, FIG. 10 and FIGS. 14 to 16, t1 denotes the total duration of the ineffective pulse of the light emission control signal inputted through the light emission control signal input terminal EM in each drive cycle. In this drive timing, when at a low level, the light emission control signal inputted through the light emission control signal input terminal EM is an effective pulse and controls the light emission control module to turn on. t2 denotes the total duration of the effective pulse of the first control signal P1 in each drive cycle. In this drive timing, when at a low level, the first control signal P1 is an effective pulse and controls the bias adjustment module to turn on. t3 denotes the total duration of the effective pulse of the fourth control signal inputted through the fourth control signal terminal P4 in each drive cycle. In this drive timing, when at a high level, the fourth control signal terminal P4 is an effective pulse and controls the threshold compensation module to turn on. Here t4 denotes the total duration of the effective pulse of the second control signal inputted through the second control signal terminal P2 in each drive cycle. In this drive timing, when at a low level, the second control signal terminal P2 is an effective pulse and controls the data write module to turn on.

The first bias adjustment stage T1 and the data write stage T2 both need to be completed in the non-light emission stage, so the control of the conductivity of the data write module, the control of the conductivity of the threshold compensation module and the control of the conductivity of the bias adjustment module all need to be completed within the ineffective pulse of the light emission control signal; therefore, t1 is the largest. The low-level bias signal needs to be written to the third node before the control terminal of the drive transistor is reset, so the bias adjustment module needs to be turned on before the threshold compensation module is turned on; therefore t2>t3. After the threshold compensation module is turned on so that the control terminal of the drive transistor is reset, the second control signal controls the data write module to turn on so that the data signal is written; therefore t3>t4.

In an embodiment, the effective pulse of the second control signal P2 is within the ineffective-pulse period of the first control signal P1. The first control signal P1 controls the bias adjustment module to turn on and off, and the second control signal P2 controls the data write module to turn on and off, so during data writing, it is needed to turn off the bias adjustment module to prevent the bias signal from being written to the second node N2 when the bias adjustment module is turned on and thus avoid the effect on the voltage at the control terminal of the drive transistor. Thus, it is needed to turn off the bias adjustment module before the data write module is turned on. Therefore, for example, referring to FIG. 8, the bias adjustment module is turned off before the rising edge of the first control signal P1 is at the falling edge of the second control signal P2 and before the data write module is turned on.

Figure 17:
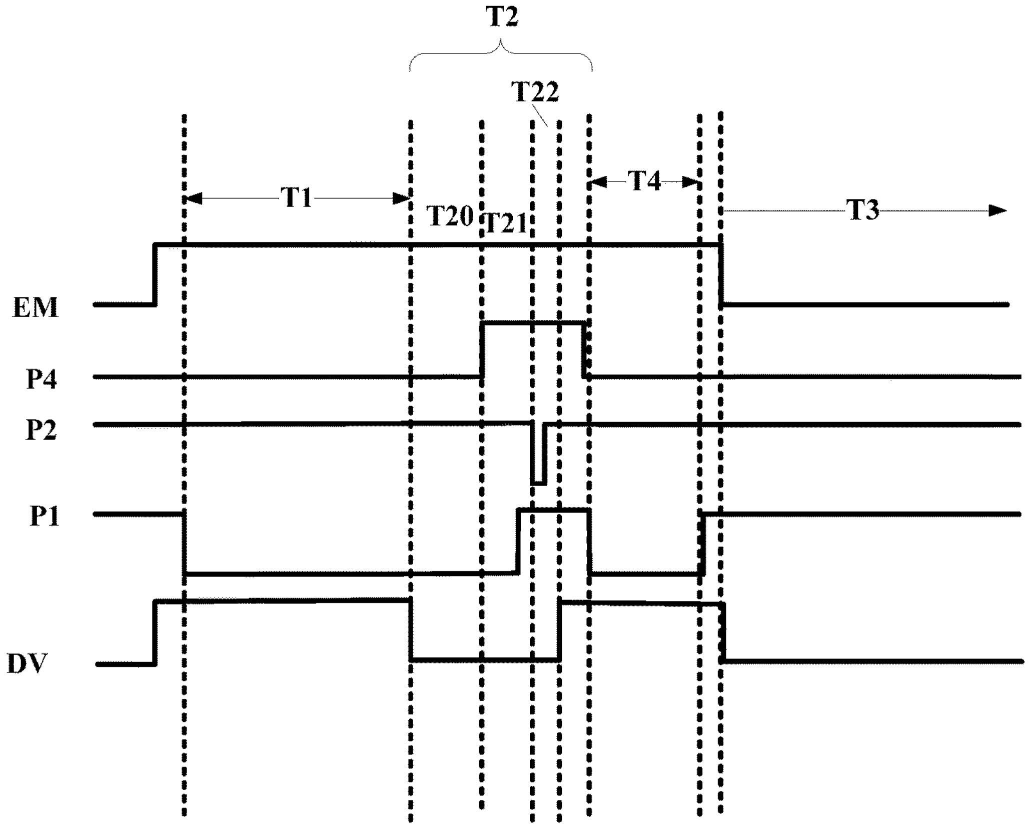
FIG. 17 is another drive timing diagram of a display panel according to some embodiments of the present disclosure.

In an embodiment, the effective pulse of the first control signal P1 in the first bias adjustment stage T1 is continuous with the effective pulse of the first control signal P1 in the data write stage T2. For example, referring to FIG. 17, the first control signal P1 does not need to be pulsed between the first bias adjustment stage T1 and the data write stage T3 so that more time can be saved for setting the first bias adjustment stage T1 and so that the hysteresis effect caused by the long-time positive bias state of the drive transistor in the previous drive cycle can be reduced.

In an embodiment, for example, referring to FIG. 3, if the pixel driving circuit further includes a light-emitting element reset module 50 electrically connected to the light-emitting element D, then the driving method of this embodiment of the present disclosure further includes that in at least part of the time period of the data write stage and the first bias adjustment stage, the light-emitting element reset module 50 resets the light-emitting element D.

Before the light emission stage, the electrode voltage on the light-emitting element D may be reset by the light-emitting element reset module 50 so that the potential on the electrode of the light-emitting element D in the previous drive cycle is prevented from affecting the image display in the current drive cycle.

Figure 18:
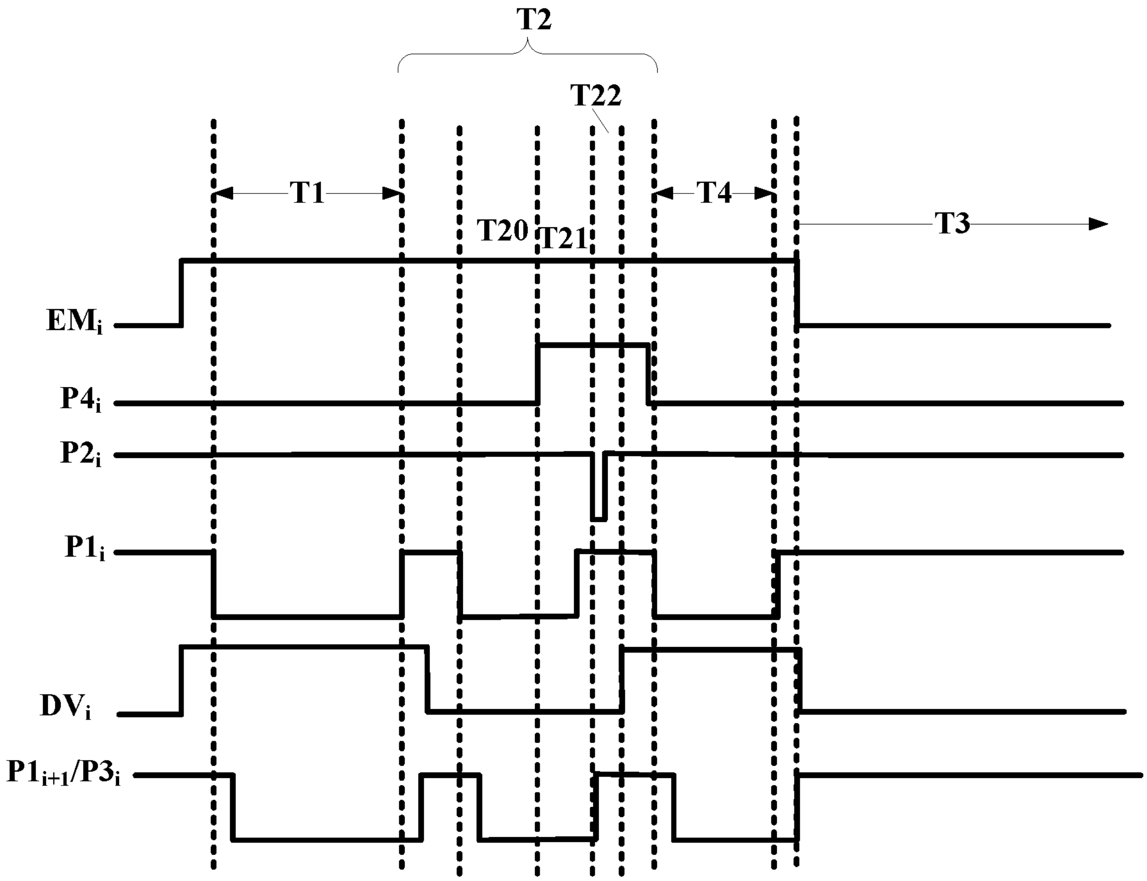
FIG. 18 is another drive timing diagram of a display panel according to some embodiments of the present disclosure.

FIG. 18 is another drive timing diagram of a display panel according to embodiments of the present disclosure. As in FIG. 4, the control terminal of the light-emitting element reset module 50 is electrically connected to a third control signal terminal P3. The third control signal terminal P3 is electrically connected to the first control signal terminal P1 of a pixel driving circuit in the next pixel row adjacent to the pixel row where the pixel driving circuit is located. The timing of the third control signal P3 is shown in FIG. 18.

Figure 19:
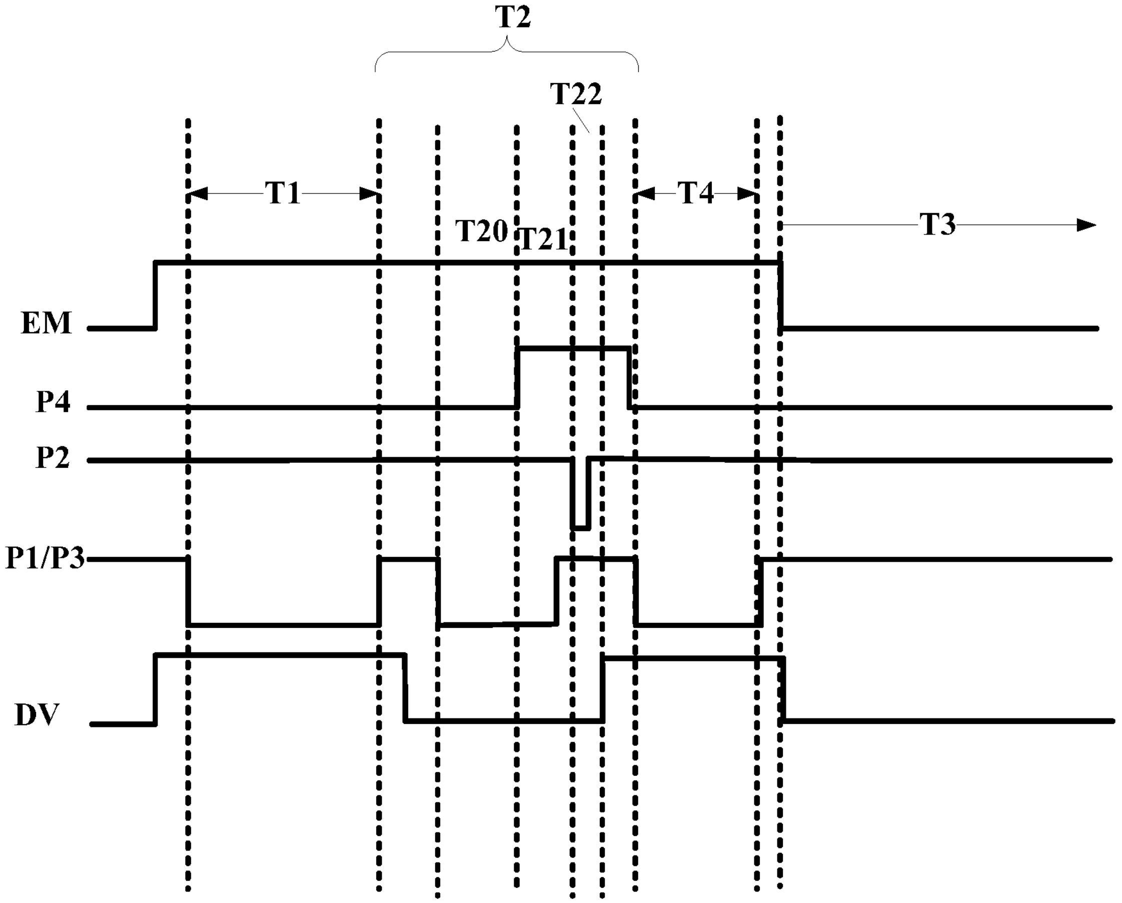
FIG. 19 is another drive timing diagram of a display panel according to some embodiments of the present disclosure.

FIG. 19 is another drive timing diagram of a display panel according to embodiments of the present disclosure. As in FIG. 5, the control terminal of the light-emitting element reset module 50 is electrically connected to a third control signal terminal P3. The third control signal terminal P3 is electrically connected to the first control signal terminal P1 in the same pixel driving circuit. That is, the first bias adjustment module 40 and the light-emitting element reset module 50 are controlled by the same signal line to turn on and off. The timing of the third control signal P3 is shown in FIG. 19.

Figure 20:
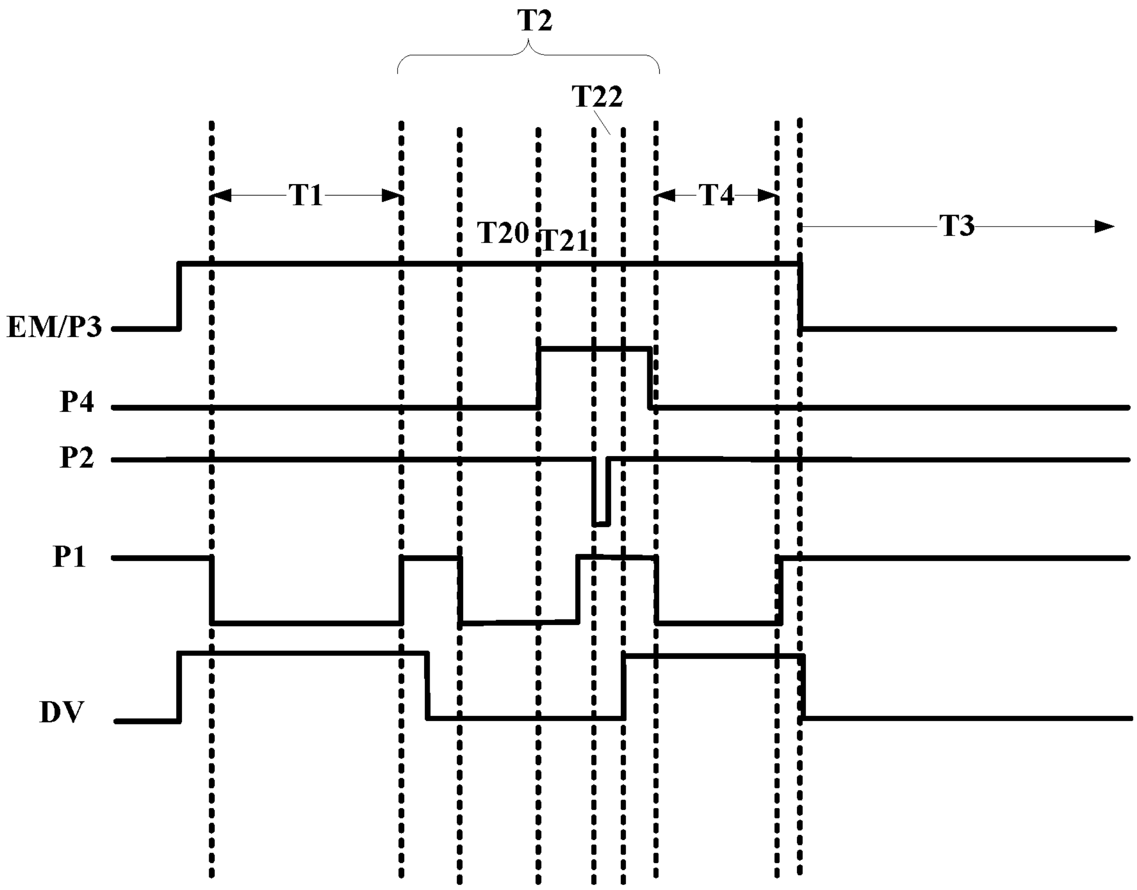
FIG. 20 is another drive timing diagram of a display panel according to some embodiments of the present disclosure.

FIG. 20 is another drive timing diagram of a display panel according to embodiments of the present disclosure. As in FIG. 6, the transistor type in the light-emitting element reset module 50 is configured to be opposite to the transistor type in the light emission control module 20. The control terminal of the light-emitting element reset module 50 is electrically connected to a third control signal terminal P3. The control terminal of the light emission control module 20 is electrically connected to a light emission control signal input terminal EM. The third control signal terminal P3 is electrically connected to the light emission control signal input terminal EM. The timing of the third control signal P3 is shown in FIG. 20.

In the drive mode shown in any one of FIGS. 18 to 20, the number of signal lines in the display panel can be reduced in conjunction with the connection of the third control signal in the pixel driving circuit; there is no need to provide a shift register circuit for the first control signal and the third control signal separately so that the bezel of the display panel can be reduced.

Figure 21:
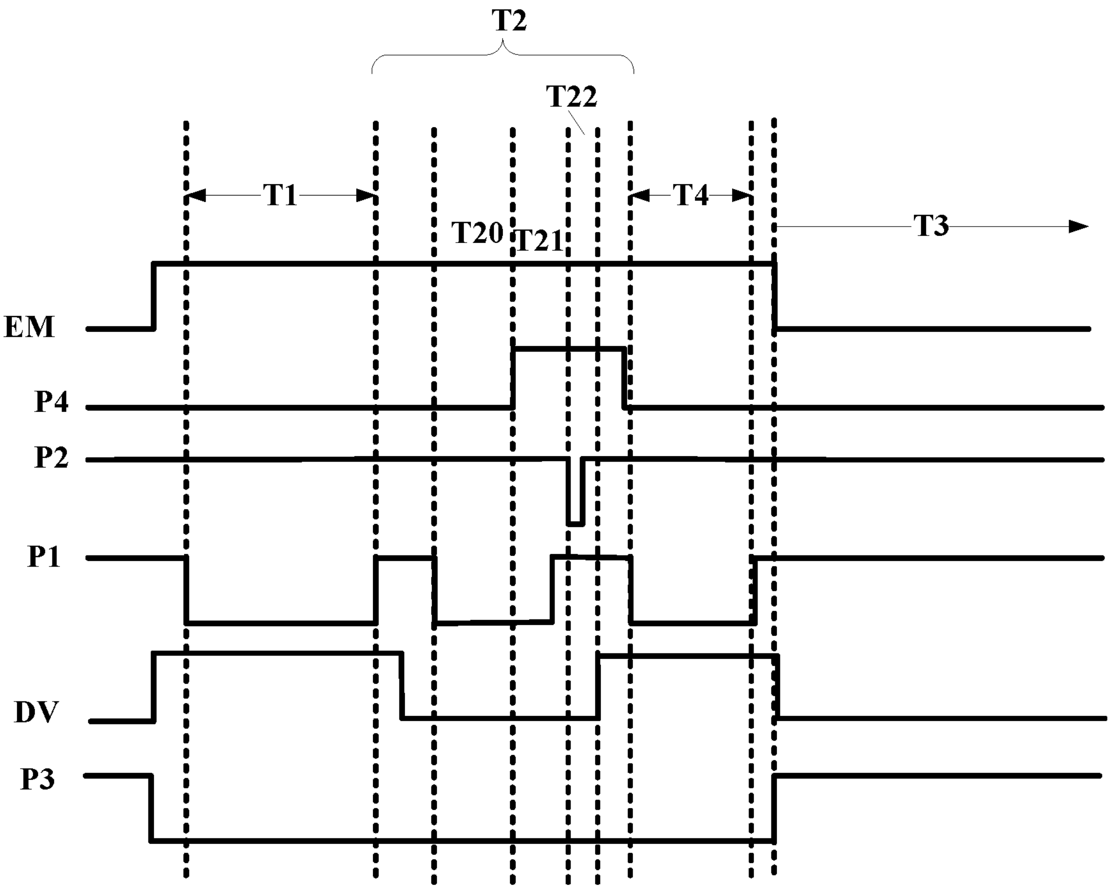
FIG. 21 is another drive timing diagram of a display panel according to some embodiments of the present disclosure.

It is, of course, also feasible to provide a signal to the third control signal P3 individually. The drive timing diagram can be seen, for example, in FIG. 21, when at a low level, the third control signal P3 is an effective pulse and can control the light-emitting element reset module 50 to turn on. It is to be noted that it is exemplarily configured in FIG. 21 that the light emission control signal EM is at a low level throughout the duration of the ineffective pulse of the light emission control signal EM, that is, the light-emitting element reset module resets the light-emitting element throughout the time period of the first bias adjustment stage T1 and the data write stage T2. If the drive cycle includes a second bias adjustment stage T4, it is also feasible to control the light-emitting element reset module to reset the light-emitting element in the second bias adjustment stage T4. In other embodiments, it is feasible to set, according to the actual requirements of the display panel, the duration in which the light-emitting element reset module resets the light-emitting element, for example, it is feasible to reset the light-emitting element in only part of the non-light emission time of the light-emitting element.

In an embodiment, the signal value of a reset signal provided for the light-emitting element D by the light-emitting element reset module 50 in the first bias adjustment stage T1 and the data write stage T2 is less than the signal value of the bias signal in the data write stage T2.

The bias signal DV provided in the data write stage T2 is used in reset of the control terminal of the drive transistor. The signal value of the reset signal provided by the light-emitting element reset module 50 for the light-emitting element D in the first bias adjustment stage T1 and the data write stage T2 is used in reset of an electrode of the light-emitting element. For example, when the anode of the light-emitting element D is reset by the light-emitting element reset module 50, the voltage difference between the anode potential of the light-emitting element D and the cathode potential of the light-emitting element D needs to be less than the threshold voltage of the light-emitting element D. Therefore, the signal value of the reset signal transmitted by the light-emitting element reset module 50 to the light-emitting element D needs to be relatively small to prevent the light-emitting element D from emitting light covertly.

In the data write stage T2, if the potential of the provided bias signal DV is too low when the bias signal DV controls the control terminal of the drive transistor T to be reset, then during charging of a storage capacitor C1 in the subsequent data write stage, the relatively small value of the bias signal DV needs to be raised to the value of the data signal to be written. As a result, the charging consumes too long a time. Therefore, in this embodiment of the present disclosure, the signal value of the reset signal provided for the light-emitting element D by the light-emitting element reset module 50 in the first bias adjustment stage T1 and the data write stage T2 may be set less than the signal value of the bias signal in the data write stage T2.

Figure 22:
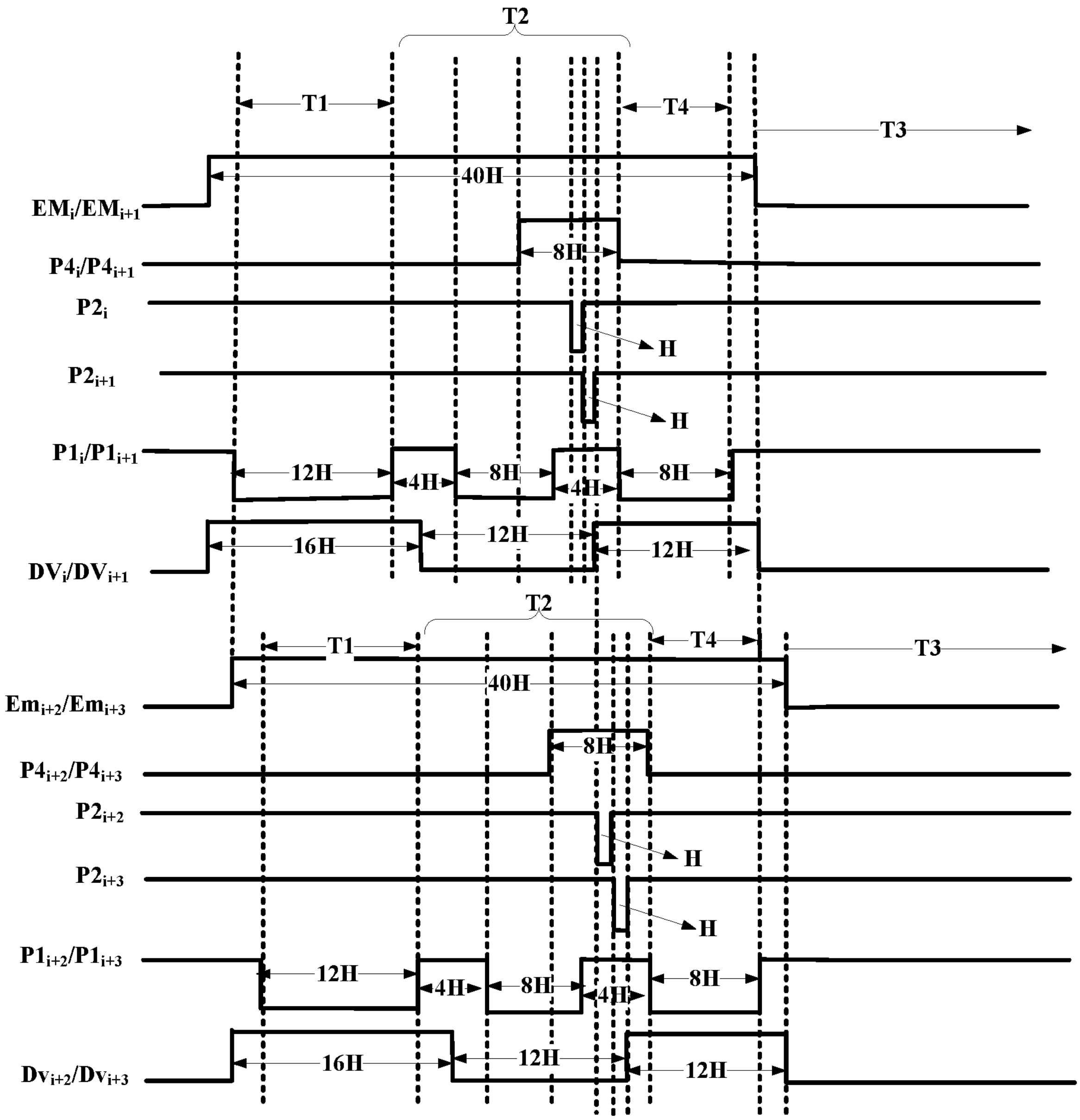
FIG. 22 illustrates a drive timing diagram of four adjacent pixel rows according to some embodiments of the present disclosure.
Figure 23:
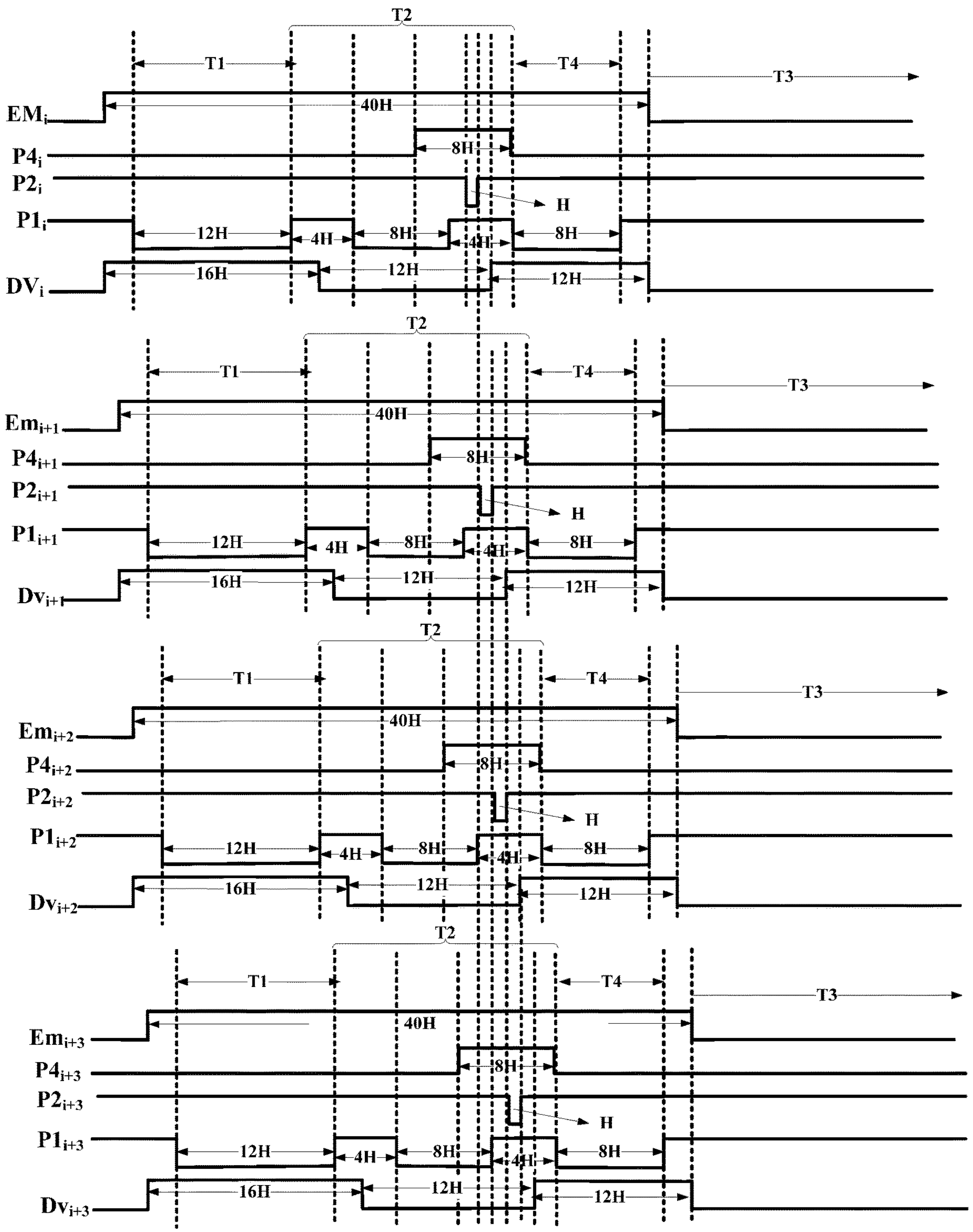
FIG. 23 illustrates another drive timing diagram of four adjacent pixel rows according to some embodiments of the present disclosure.

FIG. 22 illustrates drive timing of four adjacent pixel rows according to embodiments of the present disclosure. FIG. 23 illustrates another drive timing of four adjacent pixel rows according to embodiments of the present disclosure. In each of FIG. 22 and FIG. 23, the four adjacent pixel rows are denoted as the ith pixel row, the $(i+1)^{th}$ pixel row, the $(i+2)^{th}$ pixel row and the $(i+3)^{th}$ pixel row respectively. The first control signal P1, the second control signal P2, the fourth control signal P4 and the bias signal DV may each be outputted through a vertical shift register (VSR). In view of the pulse signal output width of the VSR circuit and signal borrowing of an n-th shift register unit and a $(n+1)^{th}$ shift register unit in the VSR circuit, if the effective pulse width of the second control signal P2 is H in the data write stage T2, then the ineffective pulse width of the light emission control signal EM can be set to 40 H; before the light emission stage T3, the effective pulse of the first control signal P1, the effective pulse of the second control signal P2, the effective pulse of the third control signal P3 and the effective pulse of the fourth control signal P4 are all within the time period of the ineffective pulse of the light emission control signal EM; in the data write stage T2, in each pixel row, the effective pulse width of the second control signal P2 is H, the effective pulse width of the first control signal P1 and the effective pulse width of the fourth control signal P4 are each 8 H, and the effective pulse width of the first control signal P1 overlaps half of the effective pulse width of the fourth control signal P4; in the first bias adjustment stage T1, the effective pulse of the first control signal P1 is 12 H; in the second bias adjustment stage T4, the effective pulse of the first control signal P1 is 8 H; the effective pulse of the first control signal P1 in the data write stage is 4 H apart from the effective pulse of the first control signal P1 in the first bias adjustment stage, and the effective pulse of the first control signal P1 in the data write stage is 4 H apart from the effective pulse of the first control signal P1 in the second bias adjustment stage; before the light emission stage T3, the timing of the bias signal DV is a high-level pulse width of 16 H, a low-level pulse width of 12 H and a high-level pulse width of 12 H in sequence. The previous settings of pulse widths may be performed in conjunction with the pixel driving circuits shown in FIG. 4, that is, a third control signal terminal $P3_i$ in a pixel driving circuit in the $i^{th}$ pixel row is electrically connected to a first control signal terminal $P1_{i+1}$ in a pixel driving circuit in the $(i+1)^{th}$ pixel row.

In the drive timing shown in FIG. 22, each two pixel rows form one pixel row group. Each shift register of the VSR circuit outputting the first control signal provides the first control signal for each pixel row group stage by stage, and the same stage of shift register of the VSR circuit outputting the first control signal provides the same first control signal for two pixel rows in the same pixel row group. Each shift register of the VSR circuit outputting the fourth control signal provides the fourth control signal for each pixel row group stage by stage, and the same stage of shift register of the VSR circuit outputting the fourth control signal provides the same fourth control signal for two pixel rows in the same pixel row group. Each shift register of the VSR circuit outputting the bias signal provides the bias signal for each pixel row group stage by stage, and the same stage of shift register of the VSR circuit outputting the bias signal provides the same bias signal for two pixel rows in the same pixel row group. Each shift register of the VSR circuit outputting the light emission control signal provides the light emission control signal for each pixel row group stage by stage, and the same stage of shift register of the VSR circuit outputting the light emission control signal provides the same light emission control signal for two pixel rows in the same pixel row group.

Referring to FIG. 22, the ith pixel row and the (i+1)th pixel row form one pixel row group, and the (i+2)th pixel row and the (i+3)th pixel row form one pixel row group. The first control signal $P1_i$ of the ith pixel row and the first control signal of the (i+1)th pixel row are each provided by the same shift register (for example, the nth stage of shift register) of the VSR circuit outputting the first control signal; the first control signal $P1_{i+2}$ of the (i+2)th pixel row and the first control signal $P1_{i+3}$ of the (i+3)th pixel row are each provided by the same shift register (for example, the (n+1)th stage of shift register) of the VSR circuit outputting the first control signal. Similarly, the fourth control signal $P4_i$ of the ith pixel row and the fourth control signal $P4_{i+1}$ of the (i+1)th pixel row are each provided by the same shift register (for example, the nth stage of shift register) of the VSR circuit outputting the fourth control signal; the fourth control signal $P4_{i+2}$ of the (i+2)th pixel row and the fourth control signal $P4_{i+3}$ of the (i+3)th pixel row are each provided by the same shift register (for example, the (n+1)th stage of shift register) of the VSR circuit outputting the fourth control signal. Similarly, the bias signal $DV_i$ of the ith pixel row and the bias signal $DV_{i+1}$ of the (i+1)th pixel row are each provided by the same shift register (for example, the nth stage of shift register) of the VSR circuit outputting the bias signal; the bias signal $DV_{i+2}$ of the (i+2)th pixel row and the bias signal $DV_{i+3}$ of the (i+3)th pixel row are each provided by the same shift register (for example, the (n+1)th stage of shift register) of the VSR circuit outputting the bias signal. Similarly, the light emission control signal $EM_i$ of the ith pixel row and the light emission control signal $EM_{i+1}$ of the (i+1)th pixel row are each provided by the same shift register (for example, the nth stage of shift register) of the VSR circuit outputting the light emission control signal; the light emission control signal $EM_{i+2}$ of the (i+2)th pixel row and the light emission control signal $EM_{i+3}$ of the (i+3)th pixel row are each provided by the same shift register (for example, the (n+1)th stage of shift register) of the VSR circuit outputting the light emission control signal. Since it is needed to provide data signals for the pixel rows row by row, the second control signals P2 of different pixel rows are provided by different shift registers of the VSR circuit outputting the second control signals, that is, each shift register of the VSR circuit outputting the second control signals provides a second control signal P2 for a respective pixel row. For example, in FIG. 22, the second control signal $P2_i$ of the ith pixel row is provided by the ith stage of shift register of the VSR circuit outputting the second control signal; the second control signal $P2_{i+1}$ of the (i+1)th pixel row is provided by the (i+1)th stage of shift register of the VSR circuit outputting the second control signal; the second control signal $P2_{i+2}$ of the (i+2)th pixel row is provided by the (i+2)th stage of shift register of the VSR circuit outputting the second control signal; the second control signal $P2_{i+3}$ of the (i+3)th pixel row is provided by the (i+3)th stage of shift register of the VSR circuit outputting the second control signal. In this embodiment of the present disclosure, the first control signal P1, the fourth control signal P4, the bias signal DV and the light emission control signal EM are shared by each two pixel rows, so the number of shift registers in the VSR circuit can be saved. In this manner, the area covered by the VSR circuit in the display panel can be reduced, and the bezel of the display panel can be reduced.

First control signals P1, fourth control signals P4, bias signals DV and light emission control signals EM may, of course, be provided for the pixel rows row by row. See, for example, the timing shown in FIG. 23.

In embodiments of the present disclosure, bias signals DV are pulse signals that can be outputted through the VSR circuit stage by stage. In embodiments of the present disclosure, the high-level pulse of a bias signal DV is denoted by DVH, and the low-level pulse of a bias signal DV is denoted by DVL; low-level pulses of a first control signal P1, a second control signal, a third control signal, a fourth control signal and a light emission control signal EM are generally configured similarly and denoted by VGL, and high-level pulses of a first control signal P1, a second control signal, a third control signal, a fourth control signal and a light emission control signal EM are also generally configured similarly and denoted by VGH. In embodiments of the present disclosure, the following setting may be performed:

VGL<DVL<DVH<VGH. Since the low-level pulse DVL of a bias signal DV mainly controls reset of an N1 node, if the DVL is too low, for example, DVL=VGL, the potential of the N1 node may vary too much in a data write stage. As a result, the charging may consume too long a time. The high-level pulse DVH of a bias signal DV is mainly inputted to an N2 node so that a drive transistor can be reversely biased. The DVH voltage does not need to be too high as long as the DVH voltage is greater than a PVDD voltage. For example, when DVH=VGH, the DVH voltage may be too high, causing the drive transistor to be reversely biased excessively. It is to be noted that in the preceding embodiments, for ease of description, a terminal is denoted by the same reference numeral as a signal transmitted through this terminal. For example, a first control signal terminal and a first control signal are both denoted by P1.

The gate control signal of the conventional pixel driving circuit is generated by the shift register circuit. Generally, one control signal of each row of pixels corresponds to one stage of shift register. The traditional way is using double-sided drive. That is, shift register circuits are connected to both terminals of each row. Since the timing sequence of the pixel driving circuit in this case is very complex, each row corresponds to 5 control signals, and 5 groups of shift register circuits are required. According to the usual setting method, two rows of pixels need to correspond to 5*2*2=20 shift register units. In order to ensure the output effect and working stability of the shift register unit, up to 10 transistors will be set, and the width to length ratio of the capacitor and the output tube is very large. Therefore, the shift register circuit usually has a large area in panel layout design.

Figure 24:
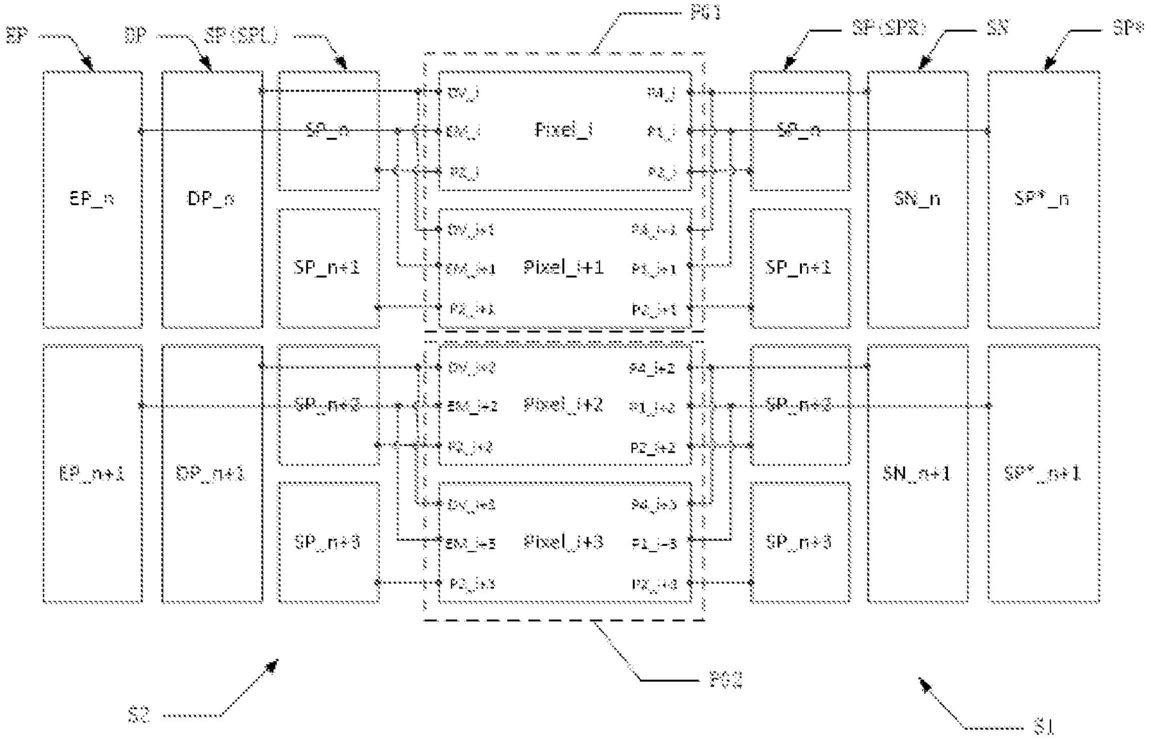
FIG. 24 is a schematic diagram of a drive manner according to an embodiment of the present disclosure.

Based on this technical problem, in another embodiment of the present application, FIG. 3, FIG. 22 and FIG. 24 are combined. FIG. 24 is a schematic diagram of a drive manner according to an embodiment of the present disclosure. The ith pixel row and the (i+1)th pixel row form a pixel row group, and the (i+2)th pixel row and the (i+3)th pixel row form a pixel row group. The first control signal of the ith pixel row and the first control signal of the (i+1)th pixel row are each provided by the nth stage of first shift register; the bias signal of the ith pixel row and the bias signal of the (i+1)th pixel row are each provided by the nth stage of third shift register; the fourth control signal of the ith pixel row and the fourth control signal of the (i+1)th pixel row are each provided by the nth stage of fourth shift register; the light emission control signal of the ith pixel row and the light emission control signal of the (i+1)th pixel row are each provided by the nth stage of light emission control shift register; the second control signal of the ith pixel row is provided by the nth stage of second shift register; and the second control signal of the (i+1)th pixel row is provided by the (n+1)th stage of second shift register.

The ith pixel row and the (i+1)th pixel row form a pixel row group, and the (i+2)th pixel row and the (i+3)th pixel row form a pixel row group. The first control signal of the (i+2)th pixel row and the first control signal of the (i+3)th pixel row are each provided by the (n+1)th stage of first shift register; the bias signal of the (i+2)th pixel row and the bias signal of the (i+3)th pixel row are each provided by the (n+1)th stage of third shift register; the fourth control signal of the (i+2)th pixel row and the fourth control signal of the (i+3)th pixel row are each provided by the (n+1)th stage of fourth shift register; the light emission control signal of the (i+2)th pixel row and the light emission control signal of the (i+3)th pixel row are each provided by the (n+1)th stage of light emission control shift register; the second control signal of the (i+2)th pixel row is provided by the (n+2)th stage of second shift register; and the second control signal of the (i+3)th pixel row is provided by the (n+3)th stage of second shift register.

Optionally, taking four pixel rows as an example, every two pixel rows forms a pixel row group, for example: adjacent pixel row Pixel_i and pixel row Pixel_i+1 form a pixel row group PG1, and adjacent pixel row Pixel_i+2 and pixel row Pixel_i+3 form another pixel row group PG2 adjacent to PG1. The first control signal terminal P1_*i* of the pixel row Pixel_i and the first control signal terminal P1_*i*+1 of the pixel row Pixel_i+1 are connected to the n-th stage of first shift register SP*_n; the first control signal terminal P1_*i*+2 of the pixel row Pixel_i+2 and the first control signal terminals P1_*i*+3 of the pixel row Pixel_i+3 are controlled by the n+1-th stage of first shift register SP*_n+1. Similarly, the fourth control signal terminal P4_*i* of the pixel row Pixel_i and the fourth control signal terminal P4_*i*+1 of the pixel row Pixel_i+1 are connected to the nth stage of fourth shift register SN_n; and the fourth control signal P4_*i*+2 of the pixel row Pixel_i+2 and the fourth control signal terminal P4_*i*+3 of the pixel row Pixel_i+3 are controlled by the (n+1)th stage of fourth shift register SN_n+1.

The bias signal terminal DV_i of the pixel row Pixel_i and the bias signal terminal DV_i+1 of the pixel row Pixel_i are connected to the nth stage of third shift register DP_n; the bias signal terminal DV_i+2 of the pixel row Pixel_i+2 and the bias signal terminal DV_i+3 of the pixel row Pixel_i+3 are controlled by the (n+1)th stage of third shift register DP_n+1. Similarly, the light emission control signal terminal EM_i of the pixel row Pixel_i and the light emission control signal terminal EM_i+1 of the pixel row Pixel_i+1 are connected to the nth stage fourth shift register EP_n; the light emission control signal terminal EM_i+2 of the pixel row Pixel_i+2 and the light emission control signal terminals EM_i+3 of the pixel row Pixel_i+3 are controlled by the (n+1)th stage of first shift register EP_n+1.

The first control signal terminal P1_*i* of the pixel row Pixel_i is connected to the nth stage of first shift register SP_n; the first control signal terminal P1_*i*+1 of the pixel row Pixel_i+1 is connected to the (n+1)th stage first shift register SP_n+1; the first control signal terminal P1_*i*+2 of the pixel row Pixel_i+2 is connected to the (n+2)th stage of first shift register SP_n+2; and the first control signal terminal P1_*i*+3 of the pixel row Pixel_i+3 is connected to the (n+3)th stage of first shift register SP_n+3.

After the design according to this embodiment, the first control signal terminal, the bias signal terminal, the first control signal terminal and the light-emitting control signal terminal all use a setting manner of a one stage of shift register driving two rows. The second control signal terminal uses a setting manner of one stage of shift register driving one row, which can significantly reduce the number of shift register units and achieve the technical effect of a narrow frame.

Optionally, in order to further reduce the number of shift register units, some signals can be driven by one side. The inventor found that the second control signal directly controls the time when the data writing transistor writes the data signal. The number of pixels connected to the second control signal determines the size of the load of the second shift register SP. The load will directly affect the delay and thus the accuracy of the written data signal. Especially for display panels driven by high frequency, the brightness of pixels is very sensitive to the time of data writing. The first control signal, the lighting control signal and the fourth control signal do not directly affect the data signal. Therefore, in the inventor's design, only the second control signal is set to double-sided driving and the setting of one stage of shift register driving one pixel row to improve the influence of single-sided driving on the display effect. Specifically, the display panel includes a first side S1, a second side S2 disposed opposite to the first side S1, and a pixel row group PG disposed between the first side S1 and the second side S2. For example, only the second control signal terminal P2 uses double-sided driving, and the signals output by the other shift registers adopt single-sided driving.

The second shift register SP includes a first sub-shift register SPR and a second sub-shift register SPL; the first sub-shift register SPR, the fourth shift register SN and the first shift register SP* are disposed on the second side Side S2; the second sub-shift register SPL, the third shift register DP and the light emission control shift register EP are disposed on a same side. According to this embodiment, the number of shift register units corresponding to two rows of pixel rows is 8, which can greatly compress the frame and achieve the technical effect of narrow frame compared to the method in which two rows of pixel rows correspond to 20 shift register units.

In addition, the light emission control shift register EP and the third shift register DP are provided on a same side, and the fourth shift register SN and the first shift register SP* are provided on a same side. The widths of the first side and the second side of the display panel can be better balanced. And according to the simulation results, in the display panel configured with non-display holes in the display region, the design of the present application has better display uniformity.

Optionally, on the first side S1 of the display panel, the second sub-shift register SPR, the fourth shift register SN and the first shift register SP* are disposed in sequence along the direction away from the display region; on the second side S2 of the panel, the first sub-shift register SPL, the third shift register DP and the light emission control shift register EP are disposed in sequence along the direction away from the display region. Since the second shift register uses the design of driving one pixel row in one stage, disposing the second shift register on the side closest to the display region can simplify the design of wiring. And according to the simulation results, in the display panel configured with non-display holes in the display region, the design of the present application has better display uniformity.

Figure 25:
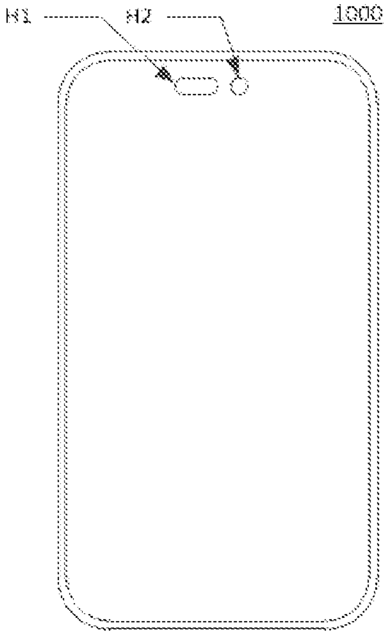
FIG. 25 is a schematic diagram of a display panel according to an embodiment of the present disclosure.
Figure 26:
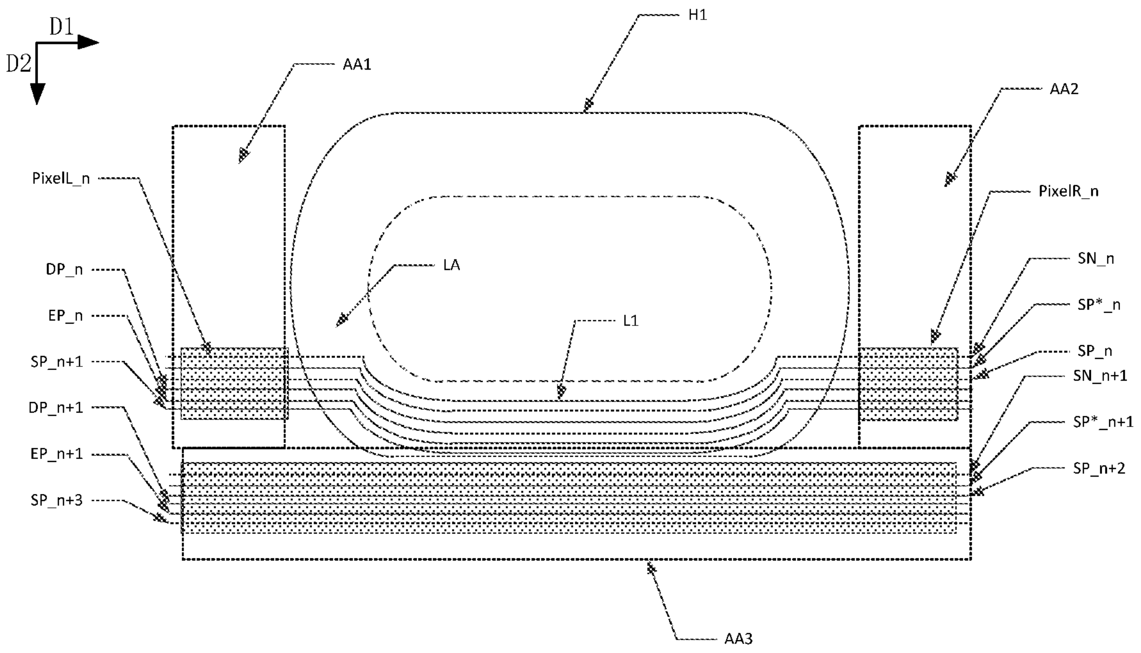
FIG. 26 is a partially enlarged schematic view of the H1 position of the display panel shown in FIG. 25.

Optionally, in another embodiment of the present application, referring to FIG. 25 and FIG. 26, FIG. 25 is a schematic diagram of a display panel according to an embodiment of the present disclosure and FIG. 26 is a partially enlarged schematic view of the H1 position of the display panel shown in FIG. 25.

The display panel includes a first non-display hole (shown in FIG. 25 as including two first non-display holes H1 and H2), and a first sub-display region AA1 and a second sub-display region AA2 which are adjacent to the first non-display hole in the first direction D1. The display panel further includes a third sub-display region AA3, and the third sub-display region AA3 is adjacent to each of the first sub-display region AA1, the second sub-display region AA2 and the non-display hole H1 in the second direction D2. The first direction D1 is perpendicular to the second direction D2. The non-display hole includes a wiring region LA, pixel rows PixelL_n of the first sub-display region AA1 and pixel rows PixelR_n of the second sub-display region are connected by the wires L1 and the wires L1 are disposed in the wiring region LA. In conjunction with the drive manner in FIG. 24, the ith pixel row and the (i+1)th pixel row each are located in the first sub-display region AA1 and the second sub-display region AA2; the wires L1 corresponding to the ith pixel row and the wires L1 corresponding to the (i+1)th pixel row each are disposed in the wiring region LA; the (i+2)th pixel row and the (i+3)th pixel row each are located in the third sub-display region AA3. Specifically, the driving signal lines used to drive the pixels in the i-th row and the (i+1)th row are all connected through the wires L1, for example: control signal lines corresponding to the nth stage of first shift register SP*_n, the nth stage of third shift register DP_n, the nth stage of fourth shift register SN_n and the nth stage of light emission control shift register EP_n are all connected through the wires L1. The control signal lines corresponding to the (n+1)th stage of first shift register SP*_n+1, the (n+1)th stage of third shift register DP_n+1, the (n+1)th stage of fourth shift register SN_n+1 and the (n+1)th stage of light emission control shift register EP_n+1 are all located in the third sub-display region AA3, which is no need to wire. In this way, the load of the two pixel rows driven by the same shift register circuit can be uniform, and thus the phenomenon of screen splitting can be avoided.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations and substitutions can be made without departing from the scope of the present disclosure. Therefore, while the present disclosure is described in detail in connection with the preceding embodiments, the present disclosure is not limited to the preceding embodiments and may include equivalent embodiments without departing from the concept of the present disclosure. The scope of the present disclosure is determined by the scope of the appended claims.

What is claimed is:

1. A display panel comprising a pixel driving circuit, wherein the pixel driving circuit comprises:

a drive transistor, a data write module, a light emission control module, a threshold compensation module and a bias adjustment module, wherein a control terminal of the drive transistor is connected to a first node, a first terminal of the drive transistor is connected to a third node, and a second terminal of the drive transistor is connected to a second node;

the data write module is configured to provide a data signal to the drive transistor;

the light emission control module is connected in series with the drive transistor and a light-emitting element respectively and is configured to control whether a drive current flows through the light-emitting;

the threshold compensation module is connected in series between the control terminal of the drive transistor and the second terminal of the drive transistor and configured to detect and self-compensate for a threshold voltage deviation of the drive transistor;

a first terminal of the bias adjustment module is connected to a bias signal terminal, a second terminal of the bias adjustment module is connected to the second terminal of the drive transistor, a control terminal of the bias adjustment module is connected to a first control signal terminal, and the bias adjustment module is configured to adjust, under control of a first control signal inputted through the first control signal terminal and a bias signal inputted through the bias signal terminal, a bias state of the drive transistor;

an ith pixel row and an (i+1)th pixel row form a pixel row group, and an (i+2)th pixel row and an (i+3)th pixel row form a pixel row group, a first control signal of the ith pixel row and a first control signal of the (i+1)th pixel row are each provided by a nth stage of first shift register, and a first control signal of the (i+2)th pixel row and a first control signal of the (i+3)th pixel row are each provided by a (n+1)th stage of first shift register, wherein each of i and n is a positive integer;

a first control signal terminal is connected to the first shift register and the bias signal terminal is connected to a third shift register;

a control terminal of the data write module is connected to a second control signal terminal and the second control signal terminal is connected to a second shift register;

a control terminal of the threshold compensation module is connected to a fourth control signal terminal and the fourth control signal terminal is connected to a fourth shift register;

a control terminal of the light emission control module is connected to a light emission control signal terminal and the light emission control signal terminal is connected a light emission control shift register;

a second control signal of the ith pixel row is provided by a nth stage of second shift register, a second control signal of the (i+1)th pixel row is provided by a (n+1)th stage of second shift register, a second control signal of an (i+2)th pixel row is provided by a (n+2)th stage of second shift register, and a second control signal of the (i+3)th pixel row is provided by a (n+3)th stage of second shift register;

the display panel comprises a first side, a second side disposed opposite to the first side, and a pixel row group disposed between the first side and the second side;

the second shift register comprises a first sub-shift register and a second sub-shift register;

the first sub-shift register stage is disposed on the first side and is connected to the corresponding pixel row through a first end;

the second sub-shift register stage is disposed on the second side and connected to the corresponding pixel row through a second end;

the first sub-shift register stage and the second sub-shift register stage are set to double-sided driving of the corresponding pixel row;

the first shift register, the third shift register, and the fourth shift register, the light emission control shift register are set to single-sided driving of the corresponding pixel row.

2. The display panel of claim 1, wherein the first shift register is disposed on the first side and is connected to a corresponding pixel row group only through a first end.

3. The display panel of claim 2, wherein the threshold compensation module comprises a first transistor;

the control terminal of the drive transistor and a first terminal of the first transistor are electrically connected to the first node; the second terminal of the drive transistor and a second terminal of the first transistor are electrically connected to the second node.

4. The display panel of claim 3, wherein the first transistor is controlled by a fourth control signal; and a fourth control signal of the ith pixel row and a fourth control signal of the (i+1)th pixel row are each provided by a nth stage of fourth shift register, and a fourth control signal of the (i+2)th pixel row and a fourth control signal of the (i+3)th pixel row are each provided by a (n+1)th stage of fourth shift register, wherein each of i and n is a positive integer.

5. The display panel of claim 4, wherein the fourth shift register is disposed on the first side and is connected to a corresponding pixel row group only through a first end.

6. The display panel of claim 3, wherein an active layer of the first transistor comprises an oxide semiconductor.

7. The display panel of claim 6, wherein an active layer of the drive transistor, an active layer of a transistor in the data write module, an active layer of a transistor in the light emission control module, and an active layer of a transistor in the bias adjustment module each comprise a low-temperature polycrystalline silicon (LTPS) material; a channel width-to-length ratio of the first transistor is greater than a channel width-to-length ratio of the drive transistor, a channel width-to-length ratio of the transistor in the data write module, a channel width-to-length ratio of the transistor in the light emission control module, and a channel width-to-length ratio of the transistor in the bias adjustment module.

8. The display panel of claim 2, wherein the bias adjustment module comprises a third transistor; a control terminal of the third transistor is electrically connected to the first control signal terminal; a first terminal of the third transistor is electrically connected to the bias signal terminal; a second terminal of the third transistor is electrically connected to the second node.

9. The display panel t of claim 8, wherein a channel width-to-length ratio of the third transistor is greater than a channel width-to-length ratio of the drive transistor.

10. The display panel of claim 8, wherein a bias signal of the ith pixel row and a bias signal of the (i+1)th pixel row are each provided by a nth stage of third shift register, and a bias signal of the (i+2)th pixel row and a bias signal of the (i+3)th pixel row are each provided by a (n+1)th stage of third shift register, wherein each of i and n is a positive integer.

11. The display panel of claim 10, wherein the third shift register is disposed on the second side and is connected to a corresponding pixel row group only through a second end.

12. The display panel of claim 2, wherein the light emission control module comprises a fourth transistor and a fifth transistor; and a first terminal of the fourth transistor is electrically connected to a first level signal input terminal, and a second terminal of the fourth transistor and the first terminal of the drive transistor are electrically connected to the third node; a first terminal of the fifth transistor is electrically connected to the second node, and a second terminal of the fifth transistor is electrically connected to the light-emitting element.

13. The display panel of claim 12, wherein the control terminal of the fourth transistor and the control terminal of the fifth transistor are connected to a same light emission control signal input terminal.

14. The display panel of claim 13, wherein a light emission control signal of the ith pixel row and a light emission control signal of the (i+1)th pixel row are each provided by a nth stage of light emission control shift register, and a light emission control signal of the (i+2)th pixel row and a light emission control signal of the (i+3)th pixel row are each provided by a (n+1)th stage of light emission control shift register, wherein each of i and n is a positive integer.

15. The display panel of claim 14, wherein the light emission control shift register is disposed on the second side and is connected to a corresponding pixel row group only through a second end.

16. The display panel of claim 2, further comprising a light-emitting element reset module electrically connected to the light-emitting element and configured to reset the light-emitting element.

17. The display panel of claim 16, wherein a control terminal of the light-emitting element reset module is electrically connected to a third control signal terminal; the third control signal terminal is electrically connected to a first control signal terminal of a pixel driving circuit in a next pixel row adjacent to a pixel row where the pixel driving circuit is located.

18. The display panel of claim 16, wherein a control terminal of the light-emitting element reset module is electrically connected to a third control signal terminal; the third control signal terminal is electrically connected to a first control signal terminal of a pixel driving circuit in a current pixel row.

19. The display panel of claim 16, wherein the light-emitting element reset module comprises a sixth transistor; wherein a first terminal of the sixth transistor is electrically connected to a reset signal terminal; and wherein a second terminal of the sixth transistor is electrically connected to the light-emitting element.

20. The display panel of claim 2, wherein the threshold compensation module and the bias adjustment module also serve as drive transistor reset modules for resetting the control terminal of the drive transistor.

21. The display panel of claim 20, wherein a control terminal of the threshold compensation module is electrically connected to a fourth control signal terminal; wherein the drive transistor reset modules transmit and reset signals to the control terminal of the drive transistor, under control of the first control signal inputted through the first control signal terminal and a fourth control signal inputted through the fourth control signal terminal.

22. The display panel of claim 1, wherein on the first side of the display panel, the second sub-shift register, the fourth shift register and the first shift register are sequentially disposed along a direction away from a display region; and on the second side of the display panel, the first sub-shift register, the third shift register and the light emission control shift register are sequentially disposed along the direction away from the display region.

23. The display panel of claim 1, wherein a first control signal of the ith pixel row and a first control signal of the (i+1)th pixel row are each provided by a nth stage of first shift register, a bias signal of the ith pixel row and a bias signal of the (i+1)th pixel row are each provided by a nth stage of third shift register, a fourth control signal of the ith pixel row and a fourth control signal of the (i+1)th pixel row are each provided by a nth stage of fourth shift register, a light emission control signal of the ith pixel row and a light emission control signal of the (i+1)th pixel row are each provided by a nth stage of light emission shift register, a second control signal of the ith pixel row is provided by a nth stage of second shift register, and a second control signal of the (i+1)th pixel row is provided by a (n+1)th stage of first shift register; and a first control signal of the (i+2)th pixel row and a first control signal of the (i+3)th pixel row are each provided by a (n+1)th stage of first shift register, a bias signal of the (i+2)th pixel row and a bias signal of the (i+3)th pixel row are each provided by a (n+1)th stage of third shift register, a fourth control signal of the (i+2)th pixel row and a fourth control signal of the (i+3)th pixel row are each provided by a (n+1)th stage of fourth shift register, a light emission control signal of the (i+2)th pixel row and a light emission control signal of the (i+3)th pixel row are each provided by a (n+1)th stage of light emission shift register, a second control signal of the (i+2)th pixel row is provided by a (n+2)th stage of second shift register, and a second control signal of the (i+3)th pixel row is provided by a (n+3)th stage of first shift register.

24. The display panel of claim 1, wherein the display panel comprises a first non-display hole, and a first sub-display region and a second sub-display region which are adjacent to the first non-display hole in a first direction; the display panel further comprises a third sub-display region, the third sub-display region is adjacent to each of the first sub-display region, the second sub-display region and the non-display hole in the second direction, wherein the first direction is perpendicular to the second direction; the non-display hole comprises a wiring region, and pixel rows of the first sub-display region and pixel rows of the second sub-display region are connected by wires, and the wires are disposed in the wiring region; the ith pixel row and the (i+1)th pixel row each are located in the first sub-display region and the second sub-display regions, and wires corresponding to the ith pixel row and wires corresponding to the (i+1)th pixel row each are disposed in the wiring region; and the (i+2)th pixel row and the (i+3)th pixel row each are located in the third sub-display region.

* * * * *